United States Patent
Lee et al.

(10) Patent No.: US 12,380,604 B2
(45) Date of Patent: Aug. 5, 2025

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC., Seoul (KR)

(72) Inventors: Sooyeon Lee, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 17/924,503

(22) PCT Filed: May 28, 2021

(86) PCT No.: PCT/KR2021/006637
§ 371 (c)(1),
(2) Date: Nov. 10, 2022

(87) PCT Pub. No.: WO2021/242036
PCT Pub. Date: Dec. 2, 2021

(65) Prior Publication Data
US 2023/0316581 A1 Oct. 5, 2023

(30) Foreign Application Priority Data
May 28, 2020 (KR) .................. 10-2020-0064484

(51) Int. Cl.
*G06T 9/00* (2006.01)

(52) U.S. Cl.
CPC .................. *G06T 9/001* (2013.01)

(58) Field of Classification Search
CPC ........ G06T 9/001; H04N 19/56; H04N 19/57; H04N 19/597; H04N 19/70
See application file for complete search history.

(56) References Cited

U.S. PATENT DOCUMENTS

| 11,778,171 | B2* | 10/2023 | Hannuksela | ......... H04N 19/188 |
| | | | | 375/240.12 |
| 2019/0045212 | A1* | 2/2019 | Rose | ............ H04N 23/698 |
| 2019/0394484 | A1* | 12/2019 | Rose | ............ H04N 19/523 |
| 2020/0380760 | A1* | 12/2020 | Vosoughi | ............ H04N 19/54 |
| 2021/0099697 | A1* | 4/2021 | Sugio | ............ H04N 19/96 |
| 2021/0144404 | A1* | 5/2021 | Aflaki Beni | ......... H04N 13/268 |
| 2021/0218969 | A1* | 7/2021 | Lasserre | ............ H04N 19/517 |
| 2021/0281874 | A1* | 9/2021 | Lasserre | ............ H03M 7/3071 |
| 2022/0166814 | A1* | 5/2022 | Hamza | ............ H04N 19/70 |

FOREIGN PATENT DOCUMENTS

| KR | 1020190075051 A | 6/2019 |
| KR | 1020190131062 A | 11/2019 |
| WO | 2020008106 A1 | 1/2020 |
| WO | 2020069600 A1 | 4/2020 |

* cited by examiner

*Primary Examiner* — Dramos Kalapodas
(74) *Attorney, Agent, or Firm* — Bryan Cave Leighton Paisner LLP

(57) ABSTRACT

A point cloud data transmission method according to an embodiment may comprise the steps of: encoding point cloud data; and transmitting the point cloud data. A point cloud data reception method according to an embodiment may comprise the steps of: receiving point cloud data; and decoding the point cloud data.

16 Claims, 29 Drawing Sheets

FIG. 6
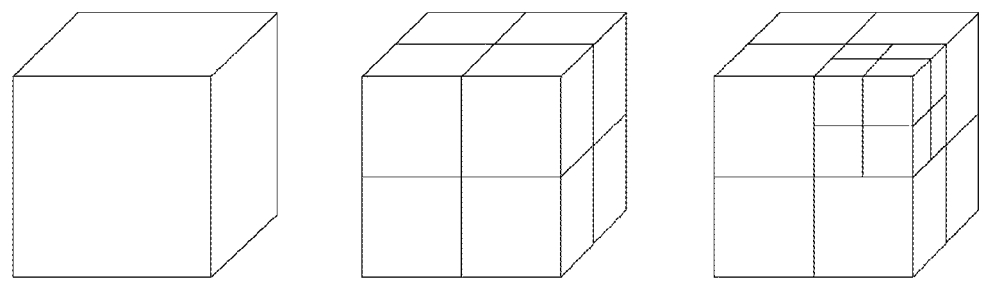
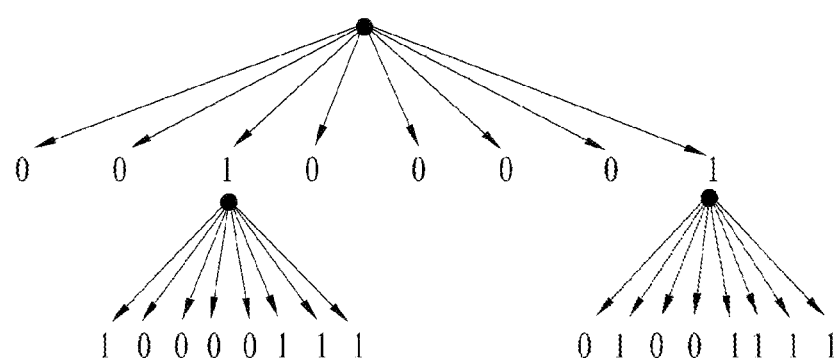

FIG. 7
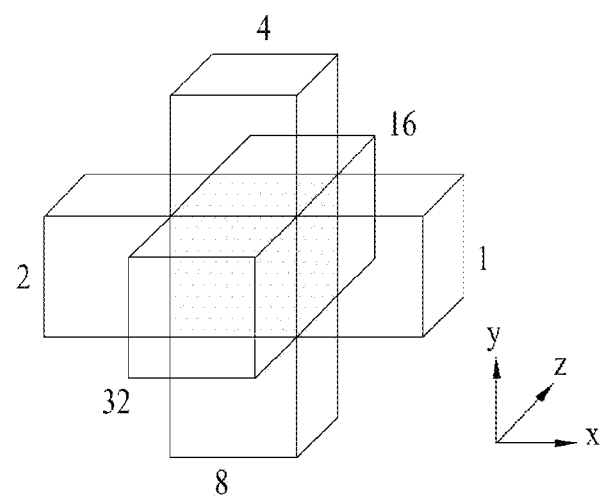
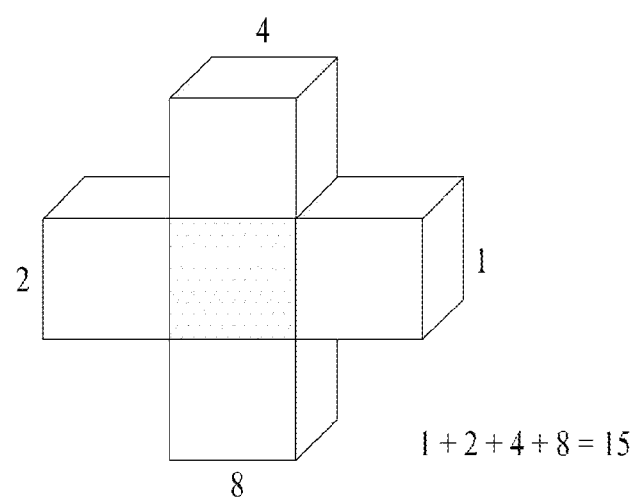
1 + 2 + 4 + 8 = 15

Range adaptive unit vector
: x>0&&y>0&&z>0, 12.85° variation
: x>0&&y>0&&z>0, 30° variation
: -10<x<0, 20° variation

FIG. 20

| | Descriptor |
|---|---|
| seq_parameter_set_rbsp( ) { | |
| ... | |
| max_difference_vectors | ue(v) |
| Amotion | ue(v) |
| motion_precision | ue(v) |
| searching_range_flag | u(1) |
| if(searching_range_flag) | |
| { num_searching_range | ue(v) |
| for(i=0;i<num_searching_range;i++) | |
| { | |
| range_x[i] | ue(v) |
| range_y[i] | ue(v) |
| range_z[i] | ue(v) |
| azimuth_variation[i] | ue(v) |
| elevation_variation[i] | ue(v) |
| range_index; | ue(v) |
| } | |
| } | |
| else | |
| { azimuth_variation | ue(v) |
| elevation_variation | ue(v) |
| } | |
| searching_pattern_update_flag | u(1) |
| if(searching_pattern_update_flag) | |
| { searching_range_update_flag | u(1) |
| If (searching_range_update_flag) | |
| { num_searching_range | ue(v) |
| best_range_index | ue(v) |
| for(j=0;j<num_searching_range;j++) | |
| { | |
| if(best_range_index==j) | |
| { | |
| azimuth_variation_2nd[j]; | ue(v) |
| elevation_variation_2nd[j]; | ue(v) |
| } | |
| else | |
| { | |
| azimuth_variation_2nd[j] | ue(v) |
| elevation_variation_2nd[j] | ue(v) |
| } | |
| } | |
| azimuth_variation_2nd | |
| elevation_variation_2nd | |
| ... | |
| } | |

FIG. 21

| | Descriptor |
|---|---|
| tile_parameter_set( ) { | |
| ... | |
| max_difference_vectors | ue(v) |
| Amotion | ue(v) |
| motion_precision | ue(v) |
| searching_range_flag | u(1) |
| if(searching_range_flag) | |
| { num_searching_range | ue(v) |
| for(i=0;i<num_searching_range;i++) | |
| { | |
|   range_x[i] | ue(v) |
|   range_y[i] | ue(v) |
|   range_z[i] | ue(v) |
|   azimuth_variation[i] | ue(v) |
|   elevation_variation[i] | ue(v) |
|   range_index; | ue(v) |
| } | |
| } | |
| else | |
| { azimuth_variation | ue(v) |
| elevation_variation | ue(v) |
| } | |
| searching_pattern_update_flag | u(1) |
| if(searching_pattern_update_flag) | |
| { searching_range_update_flag | u(1) |
| If (searching_range_update_flag) | |
| { num_searching_range | ue(v) |
| best_range_index | ue(v) |
| for(j=0;j<num_searching_range;j++) | |
| { | |
|   if(best_range_index==j) | |
|   { | |
|     azimuth_variation_2nd[j]; | ue(v) |
|     elevation_variation_2nd[j]; | ue(v) |
|   } | |
|   else | |
|   { | |
|     azimuth_variation_2nd[j] | ue(v) |
|     elevation_variation_2nd[j] | ue(v) |
|   } | |
| } | |
| azimuth_variation_2nd | |
| elevation_variation_2nd | |
| } | |
| ... | |
| } | |

FIG. 22

| | Descriptor |
|---|---|
| geometry_parameter_set( ) { | |
| ... | |
| max_difference_vectors | ue(v) |
| Amotion | ue(v) |
| motion_precision | ue(v) |
| searching_range_flag | u(1) |
| if(searching_range_flag) | |
| { num_searching_range | ue(v) |
| for(i=0;i<num_searching_range;i++) | |
| { | |
| range_x[i] | ue(v) |
| range_y[i] | ue(v) |
| range_z[i] | ue(v) |
| azimuth_variation[i] | ue(v) |
| elevation_variation[i] | ue(v) |
| range_index; | ue(v) |
| } | |
| } | |
| else | |
| { azimuth_variation | ue(v) |
| elevation_variation | ue(v) |
| } | |
| searching_pattern_update_flag | u(1) |
| if(searching_pattern_update_flag) | |
| { searching_range_update_flag | u(1) |
| If (searching_range_update_flag) | |
| { num_searching_range | ue(v) |
| best_range_index | ue(v) |
| for(j=0;j<num_searching_range;j++) | |
| { | |
| if(best_range_index==j) | |
| { | |
| azimuth_variation_2nd[j]: | ue(v) |
| elevation_variation_2nd[j]: | ue(v) |
| } | |
| else | |
| { | |
| azimuth_variation_2nd[j] | ue(v) |
| elevation_variation_2nd[j] | ue(v) |
| } | |
| } | |
| } | |
| azimuth_variation_2nd | |
| elevation_variation_2nd | |
| } | |
| ... | |
| } | |

FIG. 23

| | Descriptor |
|---|---|
| attribute_parameter_set( ) { | |
| max_difference_vectors | ue(v) |
| Amotion | ue(v) |
| motion_precision | ue(v) |
| searching_range_flag | u(1) |
| if(searching_range_flag) | |
| { num_searching_range | ue(v) |
| for(i=0;i<num_searching_range;i++) | |
| { | |
| range_x[i] | ue(v) |
| range_y[i] | ue(v) |
| range_z[i] | ue(v) |
| azimuth_variation[i] | ue(v) |
| elevation_variation[i] | ue(v) |
| range_index; | ue(v) |
| } | |
| } | |
| else | |
| { azimuth_variation | ue(v) |
| elevation_variation | ue(v) |
| } | |
| searching_pattern_update_flag | u(1) |
| if(searching_pattern_update_flag) | |
| { searching_range_update_flag | u(1) |
| If (searching_range_update_flag) | |
| { num_searching_range | ue(v) |
| best_range_index | ue(v) |
| for(j=0;j<num_searching_range;j++) | |
| { | |
| if(best_range_index==j) | |
| { | |
| azimuth_variation_2nd[j]; | ue(v) |
| elevation_variation_2nd[j]; | ue(v) |
| } | |
| else | |
| { | |
| azimuth_variation_2nd[j] | ue(v) |
| elevation_variation_2nd[j] | ue(v) |
| } | |
| } | |
| azimuth_variation_2nd | |
| elevation_variation_2nd | |
| ... | |
| } | |

FIG. 24

| geometry_slice_header( ) { | Descriptor |
|---|---|
| ... | |
| max_difference_vectors | ue(v) |
| Amotion | ue(v) |
| motion_precision | u(1) |
| searching_range_flag | |
| if(searching_range_flag) | ue(v) |
| { num_searching_range | |
| for(i=0;i<num_searching_range;i++) | |
| { | |
| range_x[i] | ue(v) |
| range_y[i] | ue(v) |
| range_z[i] | ue(v) |
| azimuth_variation[i] | ue(v) |
| elevation_variation[i] | ue(v) |
| range_index; | ue(v) |
| } | |
| } | |
| else | |
| { azimuth_variation | ue(v) |
| elevation_variation | ue(v) |
| } | |
| searching_pattern_update_flag | u(1) |
| if(searching_pattern_update_flag) | |
| { searching_range_update_flag | u(1) |
| If (searching_range_update_flag) | |
| { num_searching_range | ue(v) |
| best_range_index | ue(v) |
| for(j=0;j<num_searching_range;j++) | |
| { | |
| if(best_range_index==j) | |
| { | |
| azimuth_variation_2nd[j]; | ue(v) |
| elevation_variation_2nd[j]; | ue(v) |
| } | |
| else | |
| { | |
| azimuth_variation_2nd[j] | ue(v) |
| elevation_variation_2nd[j] | ue(v) |
| } | |
| } | |
| } | |
| azimuth_variation_2nd | |
| elevation_variation_2nd | |
| } | |
| ... | |
| } | |

FIG. 25

| | Descriptor |
|---|---|
| geometry_slice_data( ) { | |
| ... | |
| max_difference_vectors | ue(v) |
| Amotion | ue(v) |
| motion_precision | ue(v) |
| searching_range_flag | u(1) |
| if(searching_range_flag) | |
| { num_searching_range | ue(v) |
| for(i=0;i<num_searching_range;i++) | |
| { | |
| range_x[i] | ue(v) |
| range_y[i] | ue(v) |
| range_z[i] | ue(v) |
| azimuth_variation[i] | ue(v) |
| elevation_variation[i] | ue(v) |
| range_index; | ue(v) |
| } | |
| } | |
| else | |
| { azimuth_variation | ue(v) |
| elevation_variation | ue(v) |
| } | |
| searching_pattern_update_flag | u(1) |
| if(searching_pattern_update_flag) | |
| { searching_range_update_flag | u(1) |

| | |
|---|---|
| If (searching_range_update_flag) | |
| { num_searching_range | ue(v) |
| best_range_index | ue(v) |
| for(j=0;j<num_searching_range;j++) | |
| { | |
| if(best_range_index==j) | |
| { | |
| azimuth_variation_2nd[j]; | ue(v) |
| elevation_variation_2nd[j]; | ue(v) |
| } | |
| else | |
| { | |
| azimuth_variation_2nd[j] | ue(v) |
| elevation_variation_2nd[j] | ue(v) |
| } | |
| } | |
| azimuth_variation_2nd | |
| elevation_variation_2nd | |
| } | |
| ... | |
| } | | ental
POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATION

This application is the National Stage filing under 35 U.S.C. 371 of International Application No. PCT/KR2021/006637, filed May 28, 2021, which claims priority to and the benefit of Korean Patent Application No. 10-2020-0064484, filed on May 28, 2020, the disclosure of which is incorporated herein by reference in its entirety.

TECHNICAL FIELD

Embodiments relate to a method and device for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method for transmitting point cloud data may include encoding the point cloud data, and transmitting a bitstream containing the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 20 illustrates a syntax of a sequence parameter set according to embodiments;

FIG. 21 illustrates a syntax of a tile parameter set (TPS) according to embodiments;

FIG. 22 illustrates a syntax of a geometry parameter set (GPS) according to embodiments;

FIG. 23 illustrates a syntax of an attribute parameter set (APS) according to embodiments;

FIG. 24 illustrates a syntax of a geometry slice header (GHS) according to embodiments;

FIG. 25 illustrates a syntax of geometry slice data according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
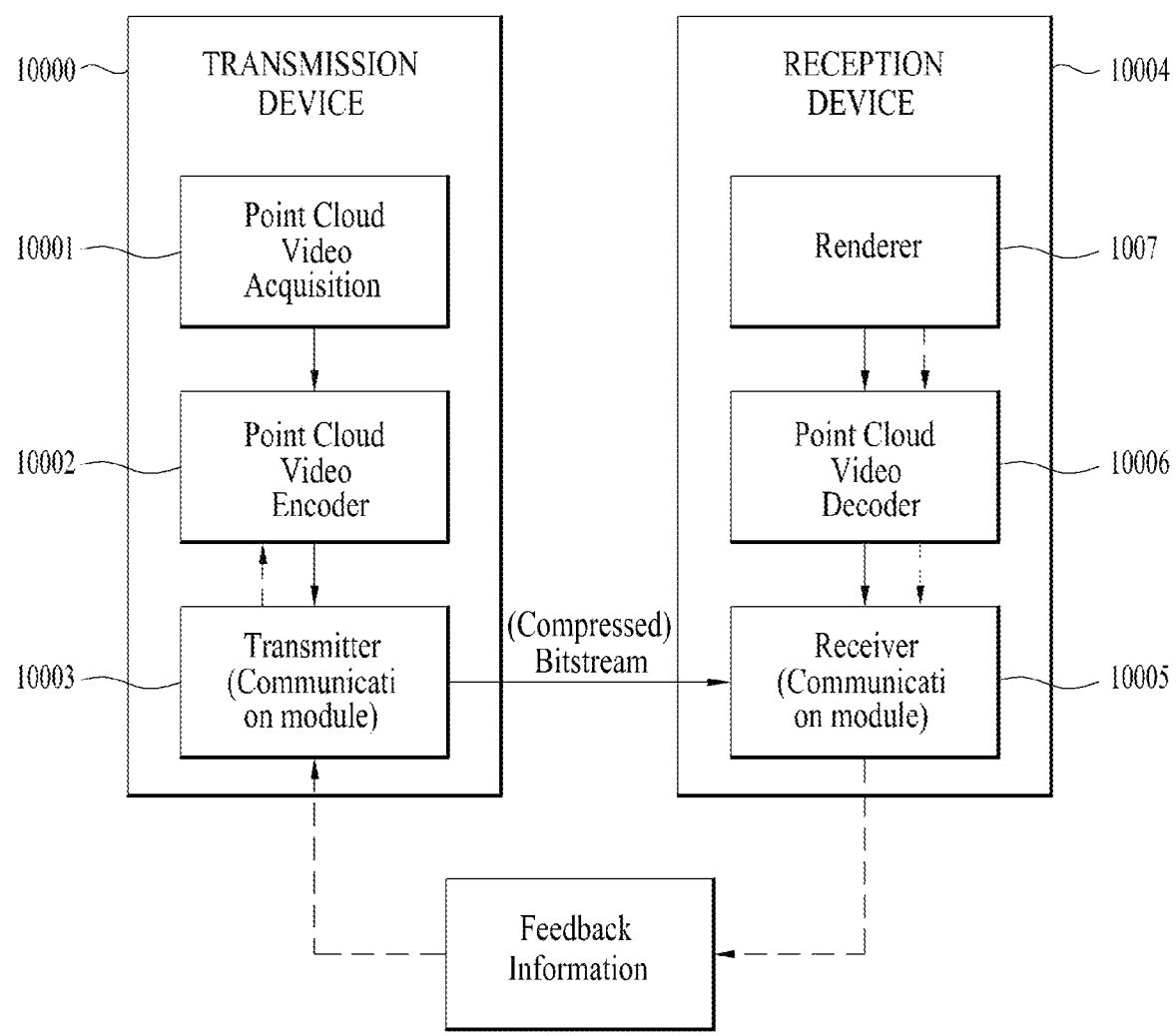
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
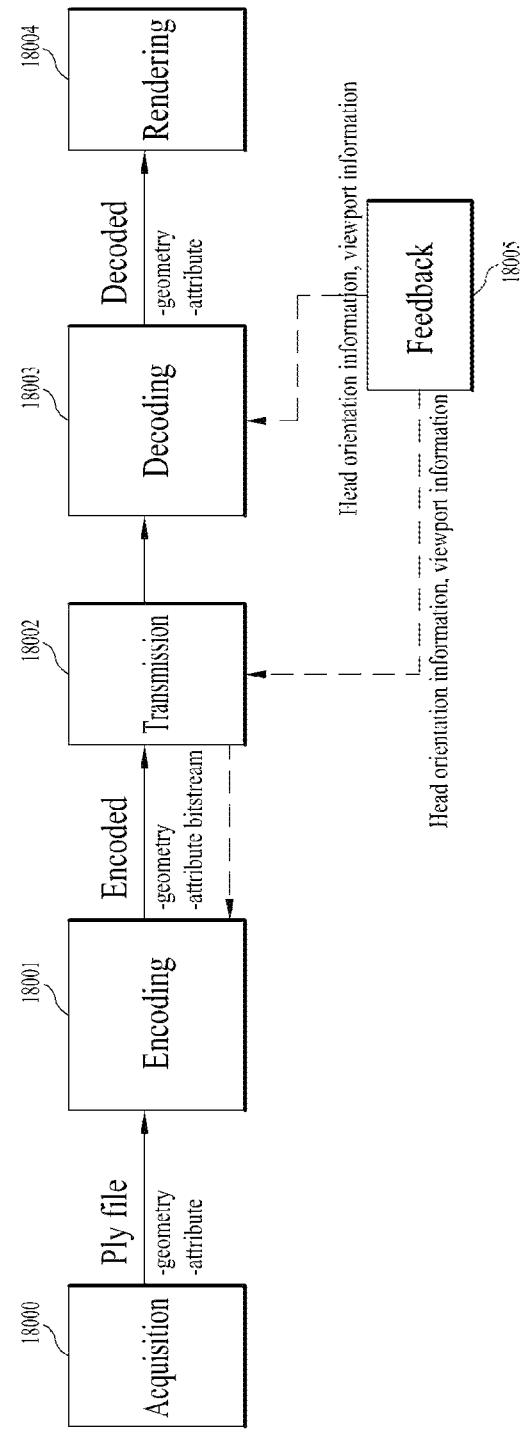
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003)

according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
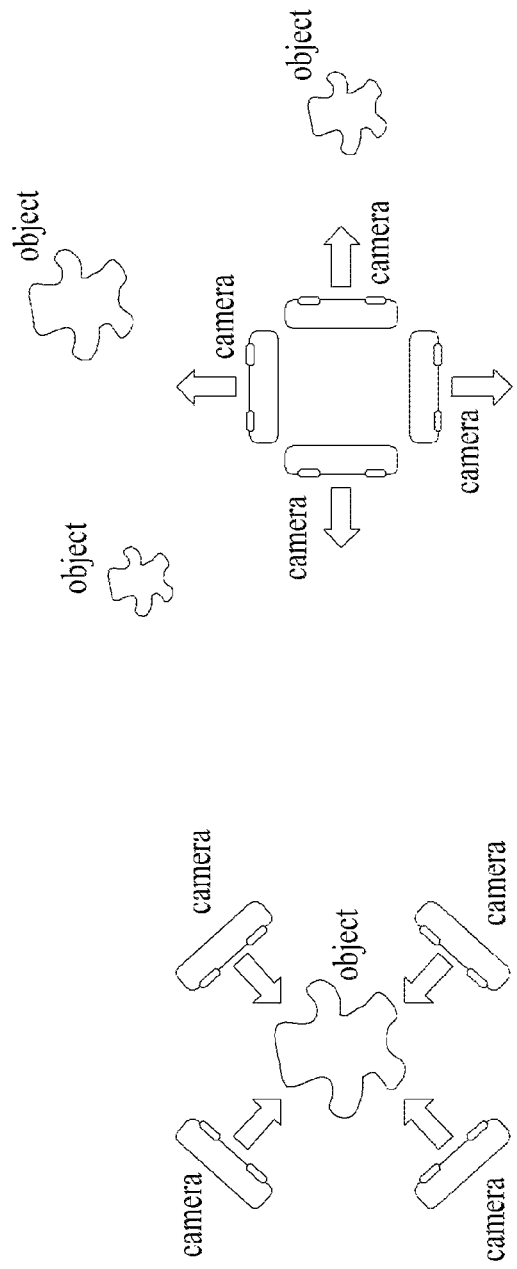
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
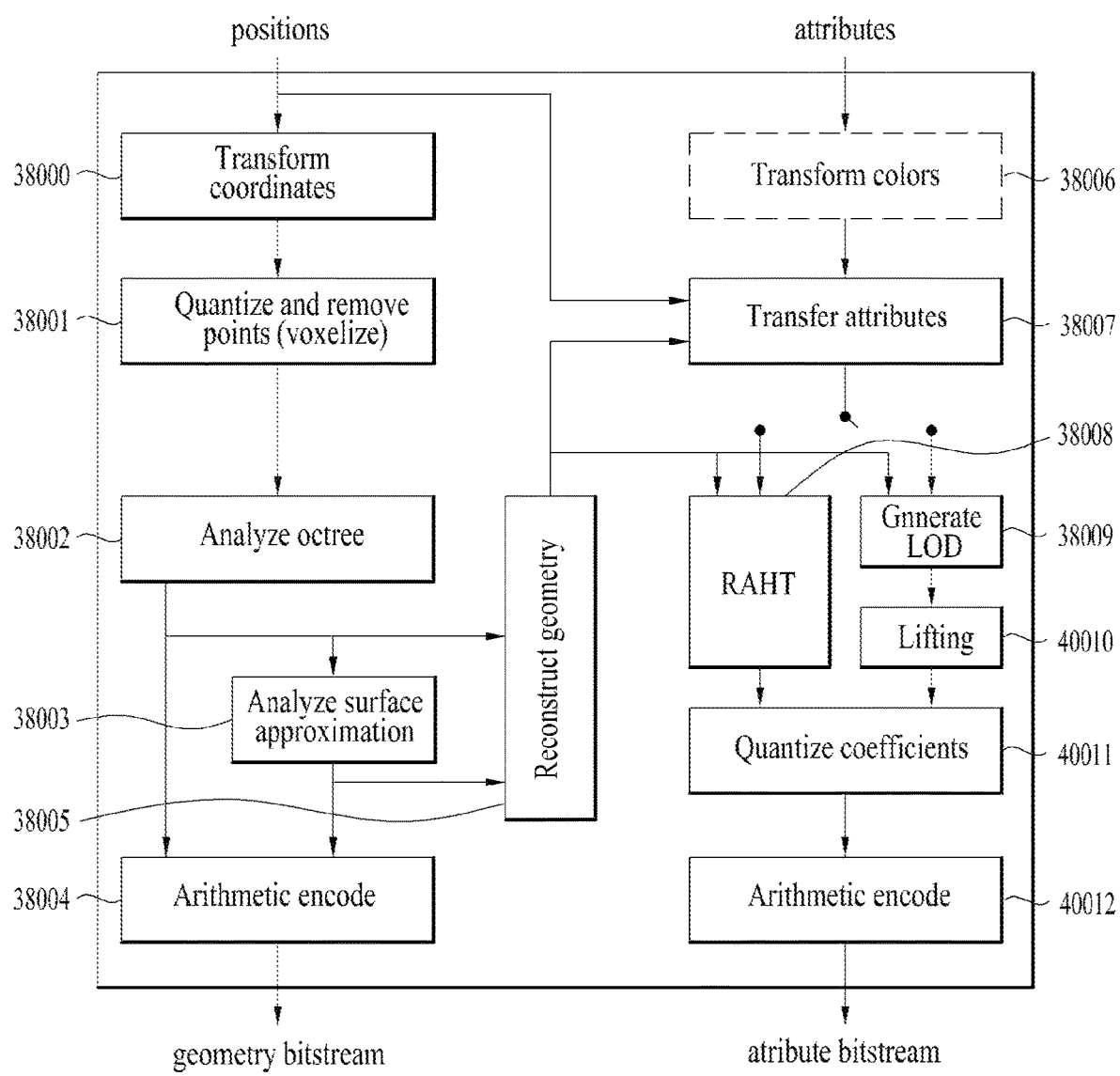
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
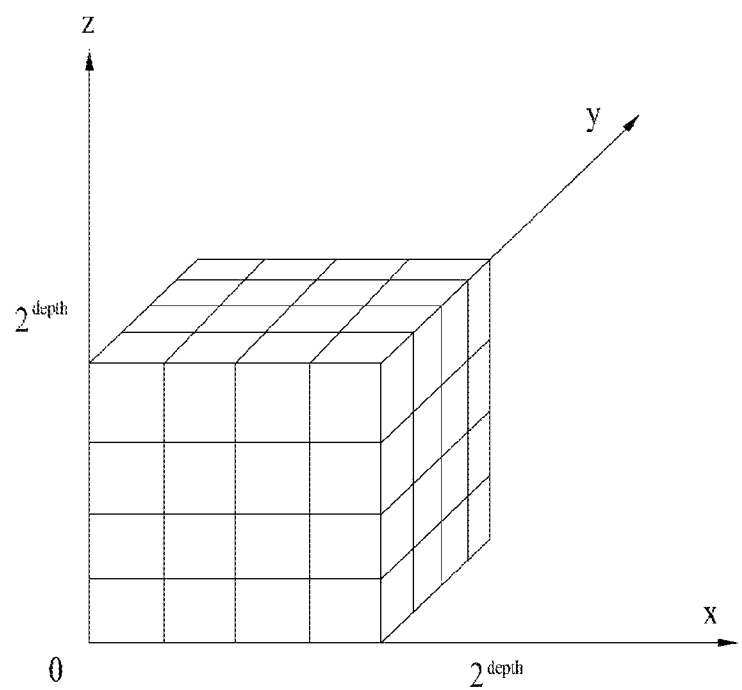
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = \text{Ceil}(\text{Log } 2(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta x$, $\Delta y$, $\Delta z$) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \qquad \text{i)}$$

-continued $$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix};$$ ii)

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix}$$ iii)

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, ..., n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
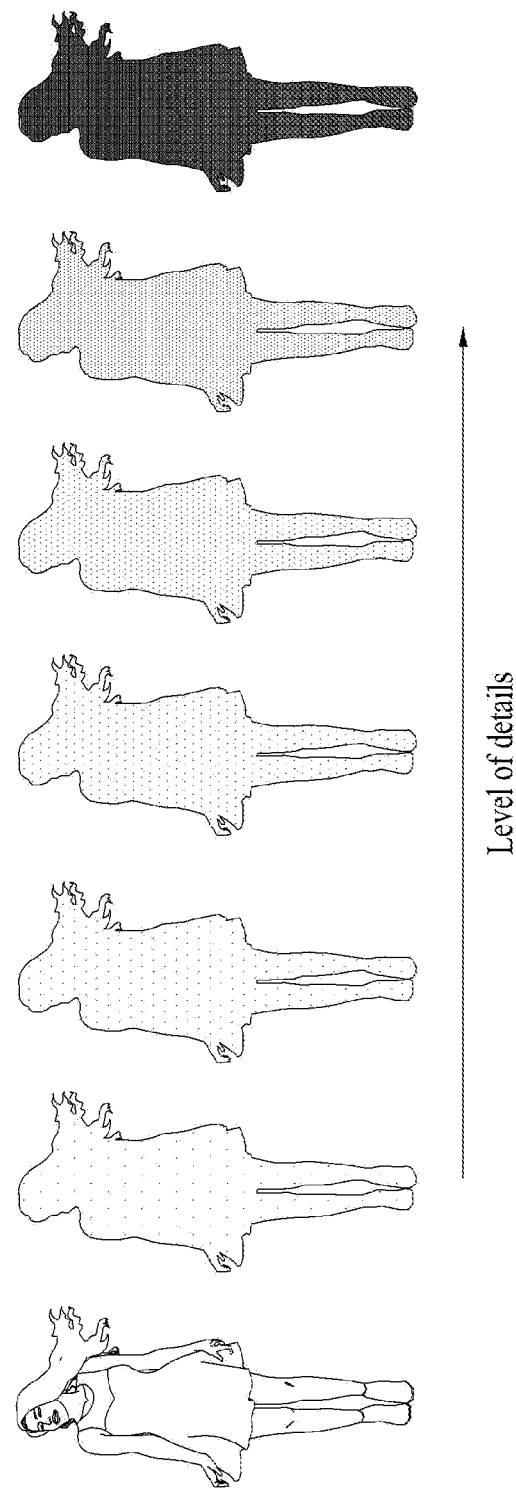
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
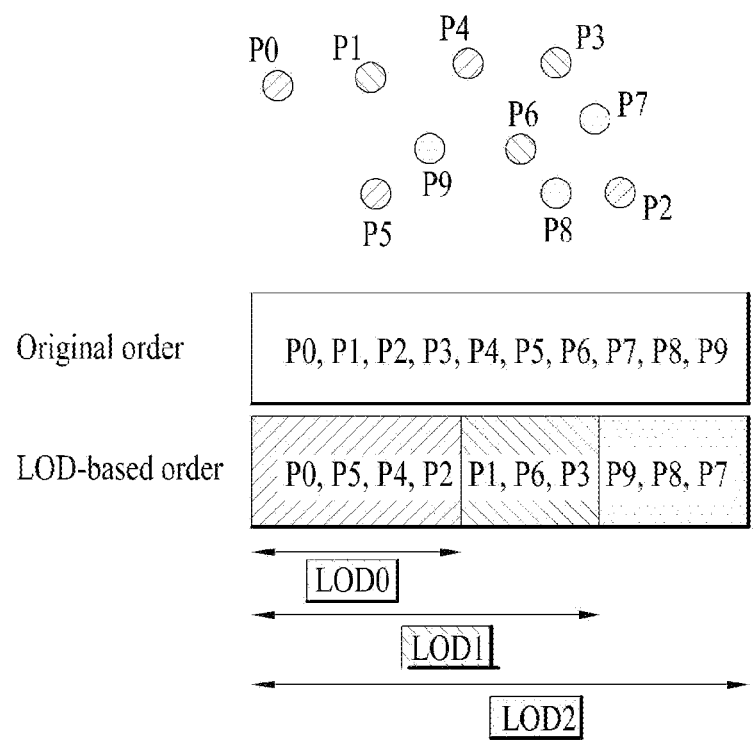
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

```
TABLE Attribute prediction residuals quantization pseudo code
int PCCQuantization(int value, int quantStep) {
if( value >=0) {
return floor(value / quantStep + 1.0 / 3.0);
} else {
return -floor(-value / quantStep + 1.0 / 3.0);
}
}
TABLE Attribute prediction residuals inverse quantization pseudo code
int PCCInverseQuantization(int value, int quantStep) {
if( quantStep ==0) {
return value;
```

-continued

```
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1 w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l_{-1_{x,y,z}}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000 w1001} \begin{bmatrix} g_{1_{0,0,0z}} \\ g_{1_{0,0,1}} \end{bmatrix}$$

Figure 10:
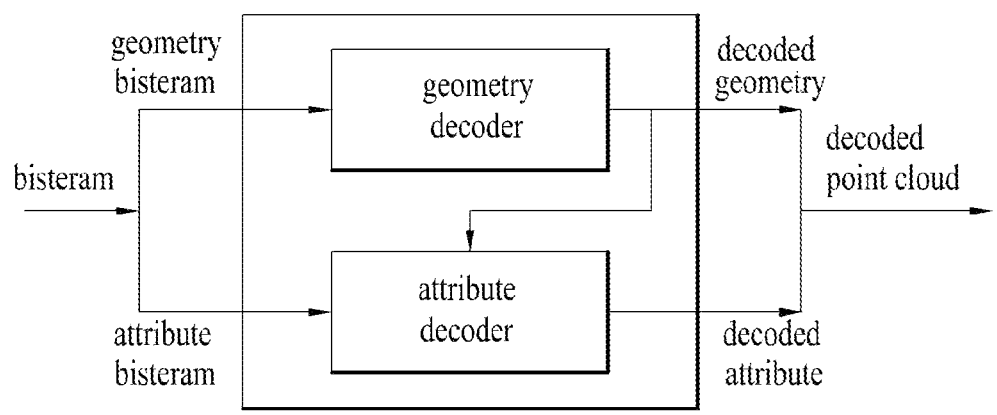
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
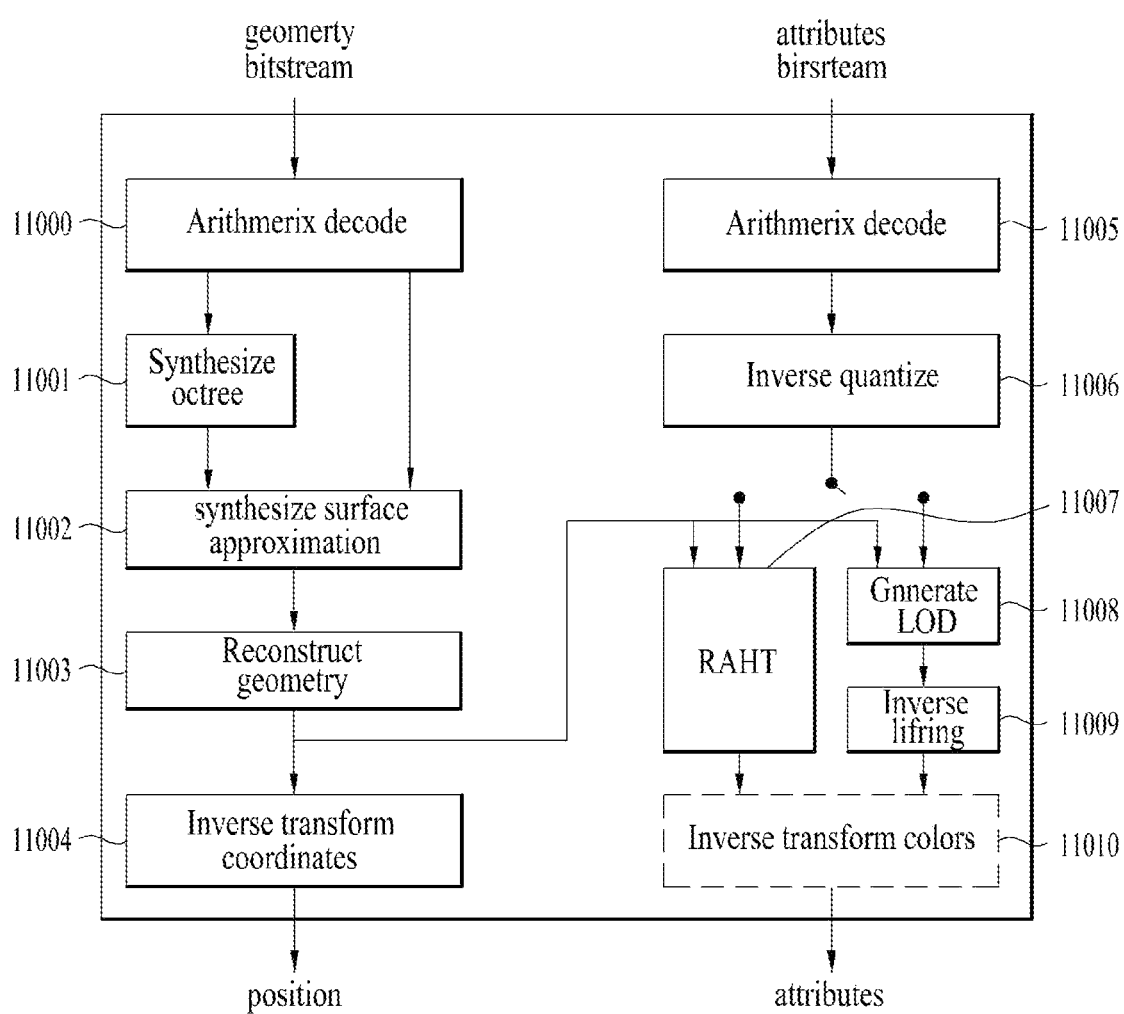
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
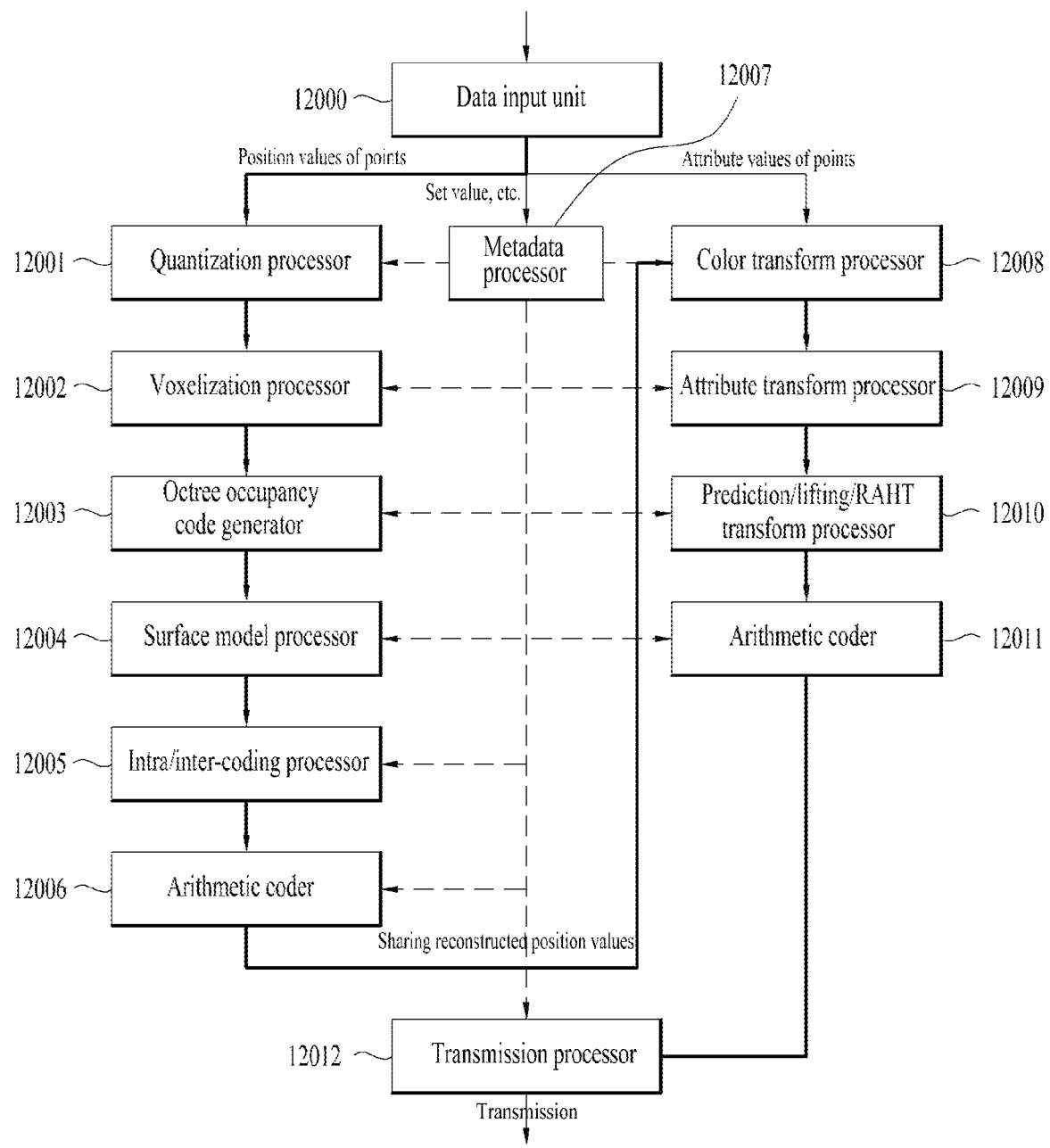
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0⁰ and one or more attribute bitstreams Attr0⁰ and Attr1⁰.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
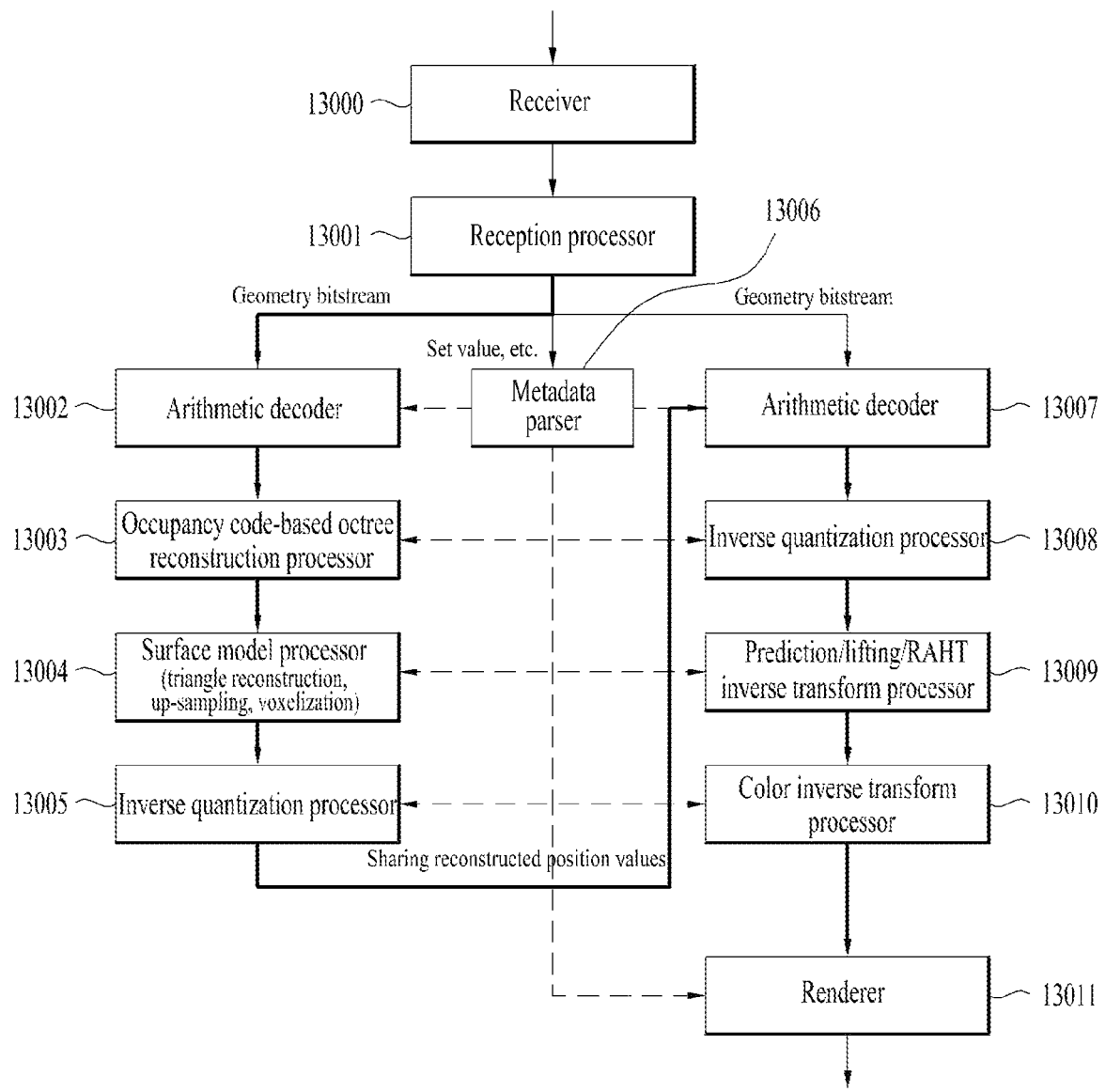
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
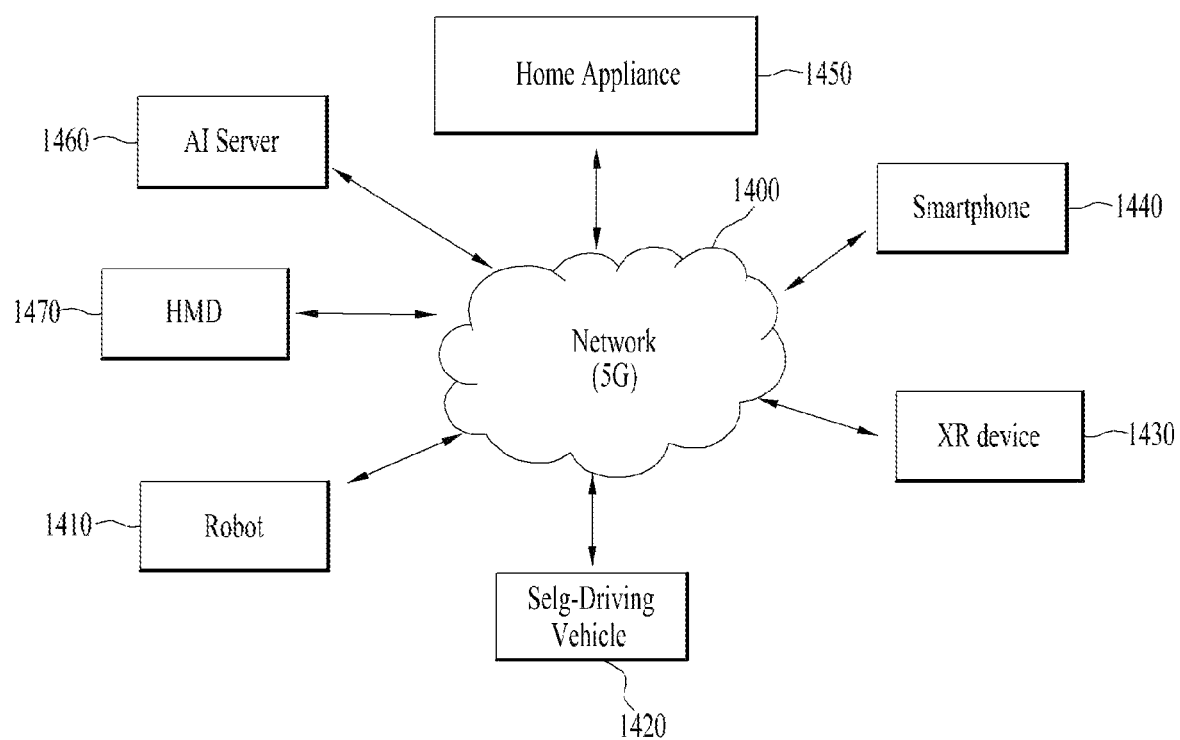
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects are to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

The method/device according designated to the embodiments refers to an encoder, a decoder, or the like included in a method/device for transmitting point cloud data, a method/device for receiving point cloud data, a point cloud data transmission/reception device.

The PCC encoder according to the embodiments may be referred to as an encoder. The PCC decoder according to the embodiments may be referred to as a decoder.

The geometry data according to the embodiments corresponds to geometry information, and the attribute data according to the embodiments corresponds to attribute information.

Figure 15:
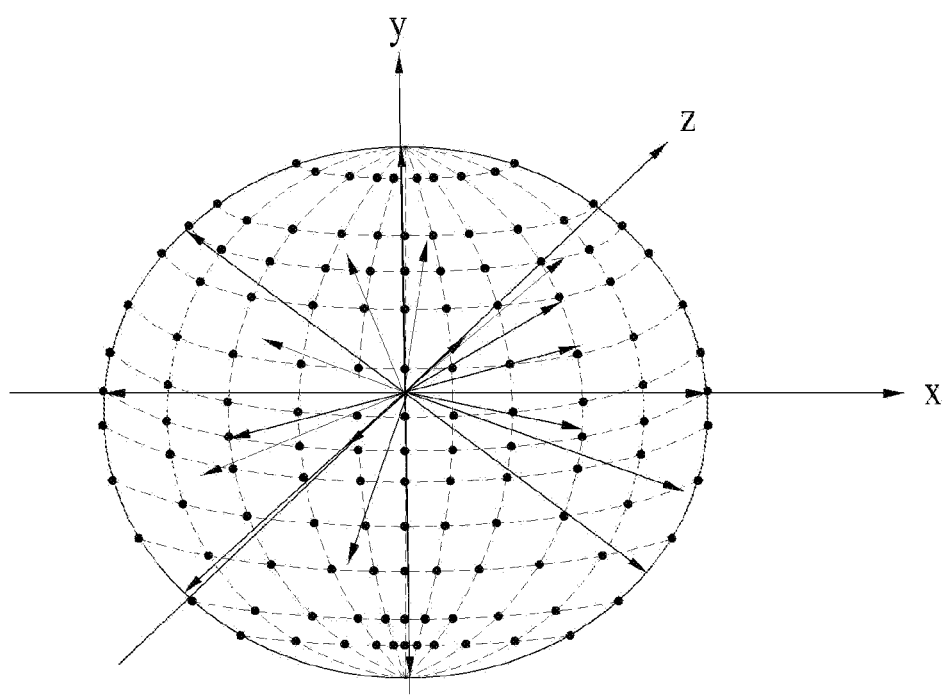
FIG. 15 illustrates a vector related to point cloud inter-prediction according to embodiments.

FIG. 15 illustrates a vector related to point cloud inter-prediction according to embodiments The transmission device 10000 of FIG. 1, the point cloud video encoder 10002, the encoding of FIG. 2, the encoder of FIG. 4, the transmission device of FIG. 13, the device of FIG. 14, and the like may perform inter-prediction to compress (encode) point cloud data. The reception device 10004 of FIG. 1, the point cloud video decoder 10006, the decoding of FIG. 2, the decoder of FIGS. 10 and 11, the reception device of FIG. 14, the device of FIG. 14, and the like may perform a reception side process of inter-prediction to reconstruct (decode) the point cloud data.

The inter-prediction of point cloud data according to the embodiments may efficiently encode and decode point cloud data by performing inter-image prediction based on a motion vector. The method/device according to the embodiments may generate a motion vector searching pattern for inter-image prediction.

The point cloud data according to the embodiments may include one or more frames. In order to efficiently compress and reconstruct the one or more frames, frame data may be effectively compressed by performing inter-frame prediction.

Motion vector estimation may be applied for inter-frame prediction coding according to embodiments, and a method of generating a searching pattern may be provided for motion vector estimation.

In a method applied for motion estimation in inter prediction (EM) technology according to embodiments, a difference in vector between points included in a prediction unit (PU) range and a window region including a PU is calculated.

In addition, when the distance between points included in the PU for each axis and the window is smaller than a motion window size, the corresponding vector is registered in the buffer as a target vector for comparison and is determined as a target of motion vector estimation.

In addition, when the distance between two points is less than a predetermined minimum distance, the minimum distance value is updated, and the rate distortion optimization (RDO) value of the distance is calculated and set as an initial reference value for splitting/skipping.

In one of the predefined searching patterns, when the amount of motion defined in a high level syntax is greater than the minimum amount of motion, a motion vector is continuously searched for.

An initial value of the best vector for not splitting the motion vector is set to (0, 0, 0), and the value of the scale factor of the search pattern x vector or the search pattern x amount of motion is added.

And if the value of any element of the vector is greater than the motion window size, the vector is out of the search range, and accordingly the same comparison is performed by applying the next search pattern.

And if the vector is within the search range, the searching pattern is compared with all buffer elements to define the minimum distance. After the comparison, the same process is performed for the next search pattern to find the minimum value. Once the minimum distance value is found through comparison between all search patterns and the buffer, a cost is calculated through RDO for the distance. When the calculated cost is less than the initial reference value for split/skip, the cost value is put in the split/skip. When the split/skip cost value is greater than the initial reference value, the initial reference value is maintained.

According to embodiments, when the cost is less than the reference value, the PU may not be further split. When the cost is greater than the reference value, the PU may be further split into sub-PUs.

When the cost value is less than the initial value, the calculated cost may replace the initial value and be used as a reference value in comparing the next cost.

For motion vectors defined in point cloud inter prediction according to embodiments, a look-up-table (LUT) consisting of a minimum of 6 to a maximum of 26 unit vectors in different directions is provided. The process of finding an optimal motion vector that must be added to obtain a point of the current frame from the vector difference of a point subject to motion estimation is performed. Then, motion compensation is performed with the best motion vector.

In this case, for the information about a unit vector defined as the LUT, 6 vectors that may be obtained by rotating 900 about each axis as described above are defined as the smallest vector LUT or searching pattern.

Also, there may be a searching pattern consisting of 26 unit vectors spaced apart by 450 in all directions. The searching pattern consisting of 26 unit vectors spaced apart by 45° may be the largest LUT. The LUT may be replaced in some cases.

A searching pattern may be carried out in a predetermined search direction to find a motion vector. However, a more detailed unit vector cannot be selected as a candidate for the searching pattern as needed, or a more dense type of searching pattern cannot exist in a specific direction.

FIG. 15 shows a vector form of a maximum size LUT defined according to embodiments, and has a 450 variation in all directions.

When a box containing all points is defined as a bounding box, it may be split into 8 nodes of the same size, and each split node may again be split into 8 nodes of the same size. This method is an octree partitioning method.

When a certain node size is reached, the corresponding node may be designated as the largest prediction unit (LPU) and be split into smaller node sizes in the same octree form, but whether to perform additional splitting is determined according to the cost for determining the split/skip. It is determined according to the cost to be judged. When the size of the PU is determined, inter prediction is performed by transmitting the information about the PU and the motion vector.

Figure 16:
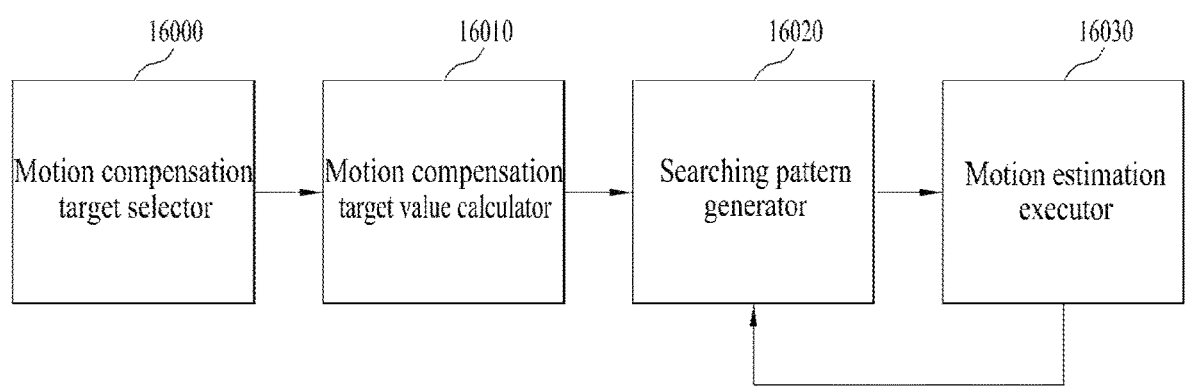
FIG. 16 illustrates a process of generating a searching pattern for motion estimation according to embodiments.

FIG. 16 illustrates a process of generating a searching pattern for motion estimation according to embodiments.

The transmission device 10000 of FIG. 1, the point cloud video encoder 10002, the encoding of FIG. 2, the encoder of FIG. 4, the transmission device of FIG. 13, the device of FIG. 14, and the like may perform inter-prediction to compress (encode) point cloud data. The reception device 10004 of FIG. 1, the point cloud video decoder 10006, the decoding of FIG. 2, the decoder of FIGS. 10 and 11, the reception device of FIG. 14, the device of FIG. 14, and the like may perform a reception side process of inter-prediction to reconstruct (decode) the point cloud data.

The inter-prediction of point cloud data according to the embodiments may efficiently encode and decode point cloud data by performing inter-image prediction based on a motion vector.

The transmission device 10000 of FIG. 1, the point cloud video encoder 10002, the encoding of FIG. 2, the encoder of FIG. 4, the transmission device of FIG. 13, the device of FIG. 14, or the like may include a motion compensation target selector 16000, a motion compensation target value calculator 16010, a searching pattern generator 16020, and/or a motion estimation executor 16030 shown in FIG. 16.

The reception device 10004 of FIG. 1, the point cloud video decoder 10006, the decoding of FIG. 2, the decoder of FIGS. 10 and 11, the reception device of FIG. 14, the device of FIG. 14, or the like may include the motion compensation target selector 16000, the motion compensation target value calculator 16010, the searching pattern generator 16020, and/or the motion estimation executor 16030 shown in FIG. 16.

The motion compensation target selector 16000, the motion compensation target value calculator 16010, the searching pattern generator 16020, and/or the motion estimation executor 16030 of FIG. 16 may correspond to hardware including one or more processors or integrated circuits configured to communicate with one or more memories, software, a processor, and/or a combination thereof.

The method/device according to the embodiments may generate a searching pattern for motion estimation of inter-prediction coding based on the process of FIG. 16.

The method/device according to the embodiments may generate a searching pattern such that the searching pattern used for motion vector estimation may be modified from the example of FIG. 15 as needed.

Specifically, in some regions, the searching pattern may be densely or sparsely arranged. Thereby, the unnecessary searching process may be minimized and the accuracy of motion vector estimation in a necessary region may be increased.

In order to find a motion vector, unit vectors may be formed at intervals of a specific angle and used as a searching pattern.

The searching pattern formed at a different angle may be used according to a region.

By defining the angles of azimuth and elevation differently, unit vectors having a different distribution according to a specific attribute (azimuth or elevation) may be defined and used as a searching pattern.

A method of forming a searching pattern of motion estimation for efficient decoding/encoding of point cloud content is carried out according to the structure of FIG. 16.

Motion compensation target selector 16000: In order to perform motion estimation between frames including point cloud data, a motion compensation target should be selected.

For example, an entire frame is divided into prediction units (PUs), and a window region including each PU and belonging to a reference frame is selected. The reference frame refers to one of a plurality of frames including point cloud data that may be referenced to process data in the current frame that is the target of current encoding/decoding.

The reference frame according to the embodiments may be related to the current frame and the order of encoding/decoding. The reference frame must always be encoded/decoded before the current frame. A frame encoded/decoded immediately before the current frame may be used as a reference. In order to increase the freedom of reference selection, one of frames encoded/decoded before the current frame may be selected as the reference frame.

When the sub-PU of a PU in a region (or node, frame, etc.) that is the target of the PU in the current frame is referred to as a block, a window represents a region including the sub-PU of the region (or node, frame, etc.) at the same position+search range in the reference frame for inter-frame coding related to the current frame. Sub-PU means each element constituting the split PU. A bounding box corresponding to a window in a reference frame including a bounding box corresponding to a predetermined region of the current frame may be present in space.

Points included in each region (prediction unit region) and window region are searched for and selected as a motion compensation target. The motion compensation target selector 16000 may be referred to as a motion compensation target selection device or the like.

Motion compensation target value calculator 16010: When a motion compensation target is selected, a vector difference of each point in the PU is calculated with respect to all points included in the window.

When the distance to the pre-selected vector is smaller than a predetermined default distance, it may be selected as a target value for motion compensation, and the vector difference may be recorded or registered in the buffer and invoked when motion estimation is performed. That is, in order to select a motion compensation target, vector differences between all points in a PU and all points in a window is calculated, and a small vector difference is stored in the buffer.

For example, vector differences between the current point and points included in the window in the reference frame may be obtained, and a vector difference smaller than a default distance among the vector differences may be set as a target vector. The target value may mean a vector difference value between point A in the current frame and point B in the window.

The motion compensation target value calculator 16010 may be referred to as a motion compensation target value calculator.

Searching pattern generator 16020: A searching pattern necessary for motion estimation may be formed using a pre-input position or variation value. The searching pattern generator may use information about the variation required to generate a pattern, the determination of a pattern generation region, the number of patterns or variation scale per region to generate a pattern. Such information may be set in the point cloud data encoder, and the point cloud data decoder may perform decoding using this information.

The searching pattern generator 16020 may be referred to as a searching pattern generation device.

Motion estimation executor 16030: After a searching pattern having i elements is determined, MV having the smallest difference among the differences of the candidate values calculated by MV=Searching Pattern(i) x Motion Amount from each element of the buffer in which the target is stored is designated as a motion vector. When the found motion vector is smaller than the default value for the initial difference, it is designated as a motion vector candidate. When the motion vector found for elements of another searching pattern is closer to the target value than the previously found motion vector candidate, the motion vector candidate is replaced.

In this way, for all searching patterns, the degrees of closeness to the target value are compared, and the smallest MV is designated as a motion vector. To increase the accuracy by repeating the aforementioned process more than once, the number of repetitions may be increased and the motion amount may be reduced (to a new motion amount). Thereby, starting from the position of the minimum MV found in the previous step, an element value of searching pattern X new Motion Amount having the smallest difference from the target value is designated as the motion vector of the point in the PU.

Here, the searching pattern may remain the same even when it is repeated. It may be updated with a new searching pattern by repetition when necessary. The motion estimation executor 16030 may be referred to as a motion estimation execution device.

Information required to define a range adaptive searching pattern according to embodiments may include the following information and be provided to the point cloud encoder and decoder.

Horizontal rotation angle (azimuth)
Vertical rotation angle (elevation)
Region of the application range
Maximum number of possible searching patterns The information according to the embodiments may be used by combining or adding each element.

Figure 17:
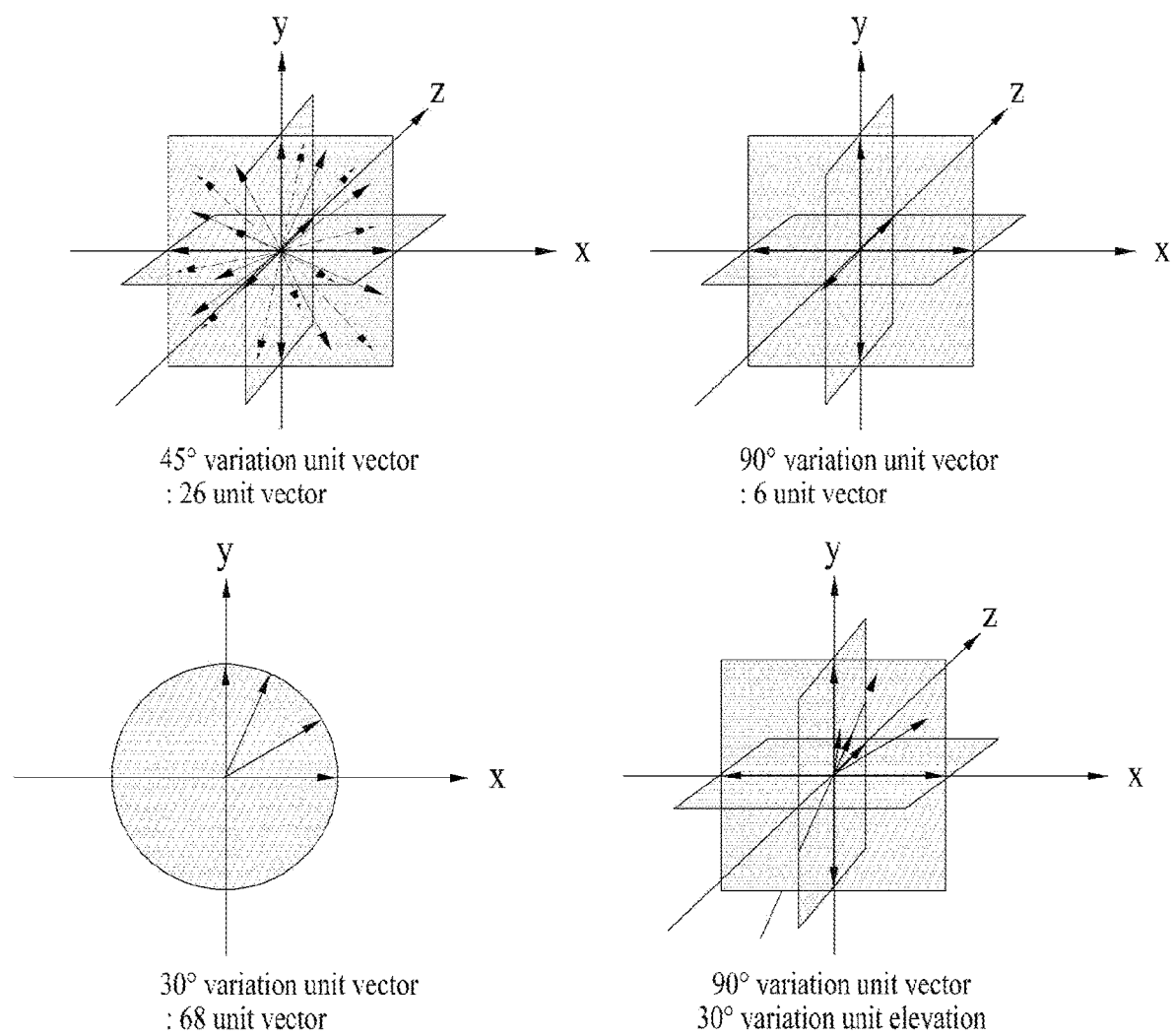
FIG. 17 illustrates an example of searching patterns according to variations according to embodiments.

FIG. 17 illustrates an example of searching patterns according to variations according to embodiments.

The transmission device 10000 of FIG. 1, the point cloud video encoder 10002, the encoding of FIG. 2, the encoder of FIG. 4, the transmission device of FIG. 13, the device of FIG. 14, and the like may perform inter-prediction to compress (encode) point cloud data. The reception device 10004 of FIG. 1, the point cloud video decoder 10006, the decoding of FIG. 2, the decoder of FIGS. 10 and 11, the reception device of FIG. 14, the device of FIG. 14, and the like may perform a reception side process of inter-prediction to reconstruct (decode) the point cloud data.

The motion compensation target selector 16000, the motion compensation target value calculator 16010, the searching pattern generator 16020, and/or the motion estimation executor 16030 of FIG. 16 included in the transmission device 10000 of FIG. 1, the point cloud video encoder 10002, the encoding of FIG. 2, the encoder of FIG. 4, the transmission device of FIG. 13, the device of FIG. 14, or the like may use the searching patterns shown in FIG. 17.

The motion compensation target selector 16000, the motion compensation target value calculator 16010, the searching pattern generator 16020, and/or the motion estimation executor 16030 of FIG. 16 included in the reception device 10004 of FIG. 1, the point cloud video decoder 10006, the decoding of FIG. 2, the decoder of FIGS. 10 and 11, the reception device of FIG. 14, the device of FIG. 14, or the like may use the searching patterns shown in FIG. 17.

FIG. 17 shows three embodiments in which the azimuth and elevation are the same and variations are different and an embodiment having different variations for the azimuth and elevation.

Examples of variation for the same azimuth and elevation may be 45°, 900 and 30°. In this case, a searching pattern may be determined based on a sequence parameter set (SPS). Alternatively, according to embodiments, the searching pattern may be determined according to a value received from an application/producer.

As the value of variation decreases, the number of searching patterns may increase. By changing the variation value, the precision/accuracy of motion vector estimation may be increased.

For example, when the variations for azimuth and/or elevation are the same as 45°, a searching pattern by 26 unit vectors may be generated. When the variations for the azimuth and/or elevation are the same as 90°, a searching pattern by 6 unit vectors may be generated. When the variations for the azimuth and/or elevation are the same as 30°, a searching pattern by 68 unit vectors may be generated.

The searching pattern in which the variation values for the azimuth and the elevation are different may be used in the case where the point cloud distribution is concentrated in a specific direction (horizontal or vertical axis). For example, when a 90° variation is applied to the azimuth and a 30° variation is applied to the elevation, a searching pattern may be generated as shown in FIG. 17.

The value of variation according to the embodiments may be expressed in units of degrees, may be expressed as the number of searching patterns, or may be expressed as (X, Y, Z).

The method/device according to the embodiments may use various searching patterns for low latency and/or accuracy according to the characteristics of the point cloud data.

Figure 18:
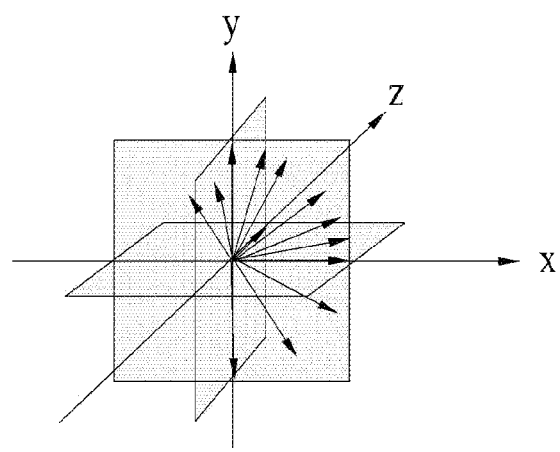
FIG. 18 illustrates an example of a searching pattern according to regions according to embodiments.

FIG. 18 illustrates an example of a searching pattern according to regions according to embodiments.

The motion compensation target selector 16000, the motion compensation target value calculator 16010, the searching pattern generator 16020, and/or the motion estimation executor 16030 of FIG. 16 included in the transmission device 10000 of FIG. 1, the point cloud video encoder 10002 of FIG. 1, the encoding of FIG. 2, the encoder of FIG. 4, the transmission device of FIG. 13, the device of FIG. 14, or the like may use searching patterns as shown in FIG. 18.

The motion compensation target selector 16000, the motion compensation target value calculator 16010, the searching pattern generator 16020, and/or the motion estimation executor 16030 of FIG. 16 included in the reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may use searching patterns as shown in FIG. 18.

FIG. 18 shows an example in which the arrangement of the searching pattern varies according to the region of the searching pattern.

For example, according to embodiments, the region of the searching pattern may be divided into three regions and a different variation may be applied to each region. The region may be defined by the producer or the point cloud encoder (the encoder of FIGS. 1, 4, and 12) according to the embodiments as needed, and delivered to the point cloud decoder (the decoder of FIGS. 1, 10, 11, and 13). Depending on the region, more or fewer searching patterns may be distributed. The regions may be divided into more regions or combined into fewer regions than in the present embodiment within the entire range.

In defining a region, the entire region obtained by combining all regions may be expressed.

Although the embodiment shows a case where the azimuth and the elevation have the same variation, the azimuth and the elevation may be defined to have different variations. While the variation of the azimuth and elevation is expressed in units of degrees in the embodiment, it may be represented as the number of searching patterns that may be present in each region or as the values of (X, Y, Z).

FIG. 18 shows region (range) adaptive unit vectors. In a region where x, y, and z are greater than 0, a searching pattern with a 12.85° variation may be applied to the azimuth and/or elevation. In a region where x is greater than 0, y is less than 0 and z is greater than 0, a searching pattern with a 30° variation may be applied to the azimuth and/or elevation. In a region where x is greater than −10 and less than 0, a searching pattern with a 20° variation may be applied.

The method/device according to the embodiments may region-adaptively use various searching patterns according to the characteristics of the point cloud data for the low latency and/or the accuracy.

Figure 19:
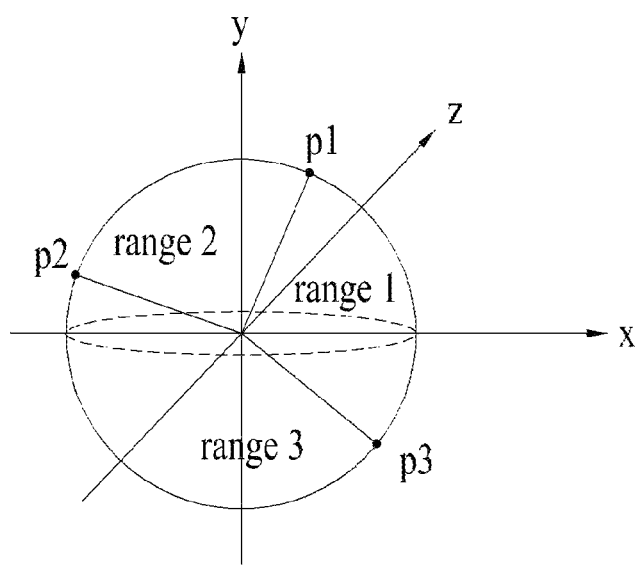
FIG. 19 illustrates a region arrangement for searching patterns according to embodiments.

FIG. 19 illustrates a region arrangement for searching patterns according to embodiments.

The motion compensation target selector 16000, the motion compensation target value calculator 16010, the searching pattern generator 16020, and/or the motion estimation executor 16030 of FIG. 16 included in the transmission device 10000 of FIG. 1, the point cloud video encoder 10002 of FIG. 1, the encoding of FIG. 2, the encoder of FIG. 4, the transmission device of FIG. 13, the device of FIG. 14, or the like may use searching patterns as shown in FIG. 19.

The motion compensation target selector 16000, the motion compensation target value calculator 16010, the searching pattern generator 16020, and/or the motion estimation executor 16030 of FIG. 16 included in the reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may use searching patterns as shown in FIG. 19.

The process of motion estimation according to the embodiments may be performed only once for all motion compensation targets. However, an optimal value may be found by performing motion estimation more than once, and therefore the searching pattern may be modified and applied according to the number of executions of the motion estimation.

For example, when the optimal value is found by performing motion estimation twice on the entire motion compensation targets, a conditional value may be set such that the searching pattern is arranged sparsely in the first trial and densely in the second trial. Alternatively, the searching pattern may be rearranged most densely in a region where the best motion vector selected in the first trial is located, and sparsely in the surrounding regions.

In order to separate ranges, coordinate information about a location of a separation point may be used.

For example, when a unit sphere is divided into three ranges (range1, range2, range3), the regions may be divided based on three coordinates (p1, p2, p3) as shown in FIG. 19.

When the best motion vector is found in the range1 region in the first motion estimation, and the motion estimation is repeated once more with the best motion vector as the starting point, the probability of finding the best motion vector in the same vector direction is high, and accordingly the accuracy may be improved by re-adjusting the position of the searching pattern generated in the first trial.

Therefore, upon receiving the information about a range in which the best motion vector is positioned, a readjustment process of densely disposing unit vectors in the range and sparsely disposing the searching pattern in the other ranges may be performed.

The method/device according to the embodiments may region-adaptively use various searching patterns according to the characteristics of the point cloud data for the low latency and/or the accuracy.

FIG. 20 illustrates a syntax of a sequence parameter set according to embodiments.

The motion compensation target selector 16000, the motion compensation target value calculator 16010, the searching pattern generator 16020, and/or the motion estimation executor 16030 of FIG. 16 included in the transmission device 10000 of FIG. 1, the point cloud video encoder 10002 of FIG. 1, the encoding of FIG. 2, the encoder of FIG. 4, the transmission device of FIG. 13, the device of FIG. 14, or the like may generate signaling information (or metadata) as shown in FIG. 20.

The motion compensation target selector 16000, the motion compensation target value calculator 16010, the searching pattern generator 16020, and/or the motion estimation executor 16030 of FIG. 16 included in the reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may generate signaling information (or metadata) as shown in FIG. 20.

The method/device according to the embodiments may generate information related to the searching pattern according to the embodiments, and transmit/receive the SPS containing the information.

FIG. 21 illustrates a syntax of a tile parameter set (TPS) according to embodiments.

The motion compensation target selector 16000, the motion compensation target value calculator 16010, the searching pattern generator 16020, and/or the motion estimation executor 16030 of FIG. 16 included in the transmission device 10000 of FIG. 1, the point cloud video encoder 10002 of FIG. 1, the encoding of FIG. 2, the encoder of FIG. 4, the transmission device of FIG. 13, the device of FIG. 14, or the like may generate signaling information (or metadata) as shown in FIG. 21.

The motion compensation target selector 16000, the motion compensation target value calculator 16010, the searching pattern generator 16020, and/or the motion estimation executor 16030 of FIG. 16 included in the reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may generate signaling information (or metadata) as shown in FIG. 21.

The method/device according to the embodiments may generate information related to the searching pattern according to the embodiments, and transmit/receive the TPS containing the information.

FIG. 22 illustrates a syntax of a geometry parameter set (GPS) according to embodiments.

The motion compensation target selector 16000, the motion compensation target value calculator 16010, the searching pattern generator 16020, and/or the motion estimation executor 16030 of FIG. 16 included in the transmission device 10000 of FIG. 1, the point cloud video encoder 10002 of FIG. 1, the encoding of FIG. 2, the encoder of FIG. 4, the transmission device of FIG. 13, the device of FIG. 14, or the like may generate signaling information (or metadata) as shown in FIG. 22.

The motion compensation target selector 16000, the motion compensation target value calculator 16010, the searching pattern generator 16020, and/or the motion estimation executor 16030 of FIG. 16 included in the reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may generate signaling information (or metadata) as shown in FIG. 22.

The method/device according to the embodiments may generate information related to the searching pattern according to the embodiments, and transmit/receive the GPS containing the information.

FIG. 23 illustrates a syntax of an attribute parameter set (APS) according to embodiments.

The motion compensation target selector 16000, the motion compensation target value calculator 16010, the searching pattern generator 16020, and/or the motion estimation executor 16030 of FIG. 16 included in the transmission device 10000 of FIG. 1, the point cloud video encoder 10002 of FIG. 1, the encoding of FIG. 2, the encoder of FIG. 4, the transmission device of FIG. 13, the device of FIG. 14, or the like may generate signaling information (or metadata) as shown in FIG. 23.

The motion compensation target selector 16000, the motion compensation target value calculator 16010, the searching pattern generator 16020, and/or the motion estimation executor 16030 of FIG. 16 included in the reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may generate signaling information (or metadata) as shown in FIG. 23.

The method/device according to the embodiments may generate information related to the searching pattern according to the embodiments, and transmit/receive the APS containing the information.

FIG. 24 illustrates a syntax of a geometry slice header (GHS) according to embodiments.

The motion compensation target selector 16000, the motion compensation target value calculator 16010, the searching pattern generator 16020, and/or the motion estimation executor 16030 of FIG. 16 included in the transmission device 10000 of FIG. 1, the point cloud video encoder 10002 of FIG. 1, the encoding of FIG. 2, the encoder of FIG. 4, the transmission device of FIG. 13, the device of FIG. 14, or the like may generate signaling information (or metadata) as shown in FIG. 24.

The motion compensation target selector 16000, the motion compensation target value calculator 16010, the searching pattern generator 16020, and/or the motion estimation executor 16030 of FIG. 16 included in the reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may generate signaling information (or metadata) as shown in FIG. 24.

The method/device according to the embodiments may generate information related to the searching pattern according to the embodiments, and transmit/receive the GSH containing the information.

FIG. 25 illustrates a syntax of geometry slice data according to embodiments.

The motion compensation target selector 16000, the motion compensation target value calculator 16010, the searching pattern generator 16020, and/or the motion estimation executor 16030 of FIG. 16 included in the transmission device 10000 of FIG. 1, the point cloud video encoder 10002 of FIG. 1, the encoding of FIG. 2, the encoder of FIG. 4, the transmission device of FIG. 13, the device of FIG. 14, or the like may generate signaling information (or metadata) as shown in FIG. 25.

The motion compensation target selector 16000, the motion compensation target value calculator 16010, the searching pattern generator 16020, and/or the motion estimation executor 16030 of FIG. 16 included in the reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may generate signaling information (or metadata) as shown in FIG. 25.

The method/device according to the embodiments may generate information related to the searching pattern according to the embodiments, and transmit/receive the geometry slice data containing the information.

The information related to the searching pattern shown in FIGS. 20 to 25 may be included and transmitted in a bitstream containing point cloud data. Related information may be included in each of FIGS. 20, 21, 22, 23, 24, and 25 or may be redundantly included.

Parameters (signaling information) shown in FIGS. 20 to 25 are defined as follows.

max_difference_vectors: a criterion for selecting a target point among the points in the window and PU. The target point (point_target) and the window point (point_window) satisfying the condition of the difference between the target point and the point of the window (|point_target-point_window|)<the maximum vector difference (max_difference_vactors may be points to be subjected to motion estimation.

Amotion: indicates the motion amount to be multiplied by the searching pattern to perform motion estimation. When motion estimation is repeated more than once, the motion is reduced by ½ each time the estimation is repeated.

Motion_precision: indicates the minimum motion amount to be multiplied by the searching pattern to perform motion estimation. Amotion cannot be less than motion_precision. The number of digits of Amotion may be set by motion_precision.

searching range_flag: a flag for determining whether to divide the region in forming a searching pattern to arrange the searching pattern differently according to the divided regions (FIG. 19, etc.). When the flag is 1, the ranges are divided. When the flag is 0, a balanced searching pattern is regularly formed regardless of the regions.

num_searching_range: indicates the number of regions to be arranged when the searching pattern is arranged differently for each region. The following is information related to each region.

range_x[i], range_y[i], and range_z[i]: x, y, and z coordinate values of points for indicating the i-th region. Each region is represented as range_x[i], range_y[i], and range_z[i], and i increases from 0 to num_searching_range−1 until it is equal to num_searching_ranges. In a 3D space coordinate system, an area between a straight line passing through the origin and a point (range_x[i], range_y[i], range_x[i]) and a straight line passing through the origin and a point (range_x[i+1], range_y[i+1], range_z[i+1]) is designated as one region. That is, one region is an area that is above the straight line passing through the origin and the point (range_x[i], range_y[i], range_x[i]) and below the straight line passing through the origin and the point (range_x[i+1], range_y[i+1], range_z[i+1]).

azimuth_variation[i] and elevation_variation[i]): may indicate the variations of the searching pattern in terms of azimuth and elevation in the i-th region. When the variations of azimuth and elevation are the same, one value representing the same may be signaled.

range_index; may indicate an index for distinguish the regions defined by range_x[i], range_y[i], and range_z[i].

azimuth_variation and elevation_variation: indicate an azimuth variation and an elevation variation when searching patterns are regularly arranged according to values of the variations without differentiating among the regions. When the azimuth variation is equal to the elevation variation, one variation may replace the other one.

searching_pattern_update_flag: a flag for signaling repetition when motion estimation is repeated once or more. When the value of the flag is 1, the searching pattern is updated. When the value of the flag is 0, the previously generated searching pattern is used.

num_searching_range: indicates the number of regions to be updated when the searching pattern is updated differently according to each region.

searching_range_update_flag: When saerching_range_update_flag is 1 while the searching_pattern_update is performed, the searching pattern is arranged differently for each previously declared region.

best_range_index: signals range_index of a region where a motion vector obtained as a result of the motion estimation performed earlier is located in order to vary the arrangement of the searching pattern in the region when the previously declared searching pattern is differentiated for each region.

azimuth_variation_2nd[j] and elevation_variation_2nd[j]: j increases from 0 to num_searching_range−1 until it is equal to the number of num_searching_range. The variations of azimuth and elevation may be set different from each other for each region indicated by j. When the azimuth variation and elevation variation are signaled as the same value, one variation may be replaced with the other one.

azimuth_variation_2nd and elevation_variation_2nd: indicate azimuth_variation and elevation_variation even when the searching pattern is updated and changed without differentiating the regions. When the two variations are equal to each other, one variation may replace the other one and be signaled.

The point cloud reception device according to the embodiments may check whether there is a searching range distinguished for each region (searching_range_flag) based on the signaling information according to the embodiments. When there is a search range (if(searching_range_flag)), it may check the ranges on the respective axes (range_x[i], range_y[i], range_z[i]) according to the number of searching ranges (num_searching_range), and check azimuth_variation[i] and elevation_variation[i]. Also, the indexes (range_index) for the ranges may be recognized.

When regions of the searching ranges are not distinguished from each other, the point cloud reception device according to the embodiments may check only the azimuth_variation and elevation_variation.

In addition, the point cloud reception device according to the embodiments may check searching_pattern_update_flag, receive the best range index, and receive the first azimuth variation and elevation variation updated for each num_searching_range. In the case where the current region corresponds to the best range index, the device may acquire azimuth_variation_2nd[j] and elevation_variation_2nd[j] corresponding to the region.

The point cloud reception device (decoder) according to the embodiments may reconstruct the encoded point cloud data by performing motion estimation based on the signaled searching pattern related information.

Figure 26:
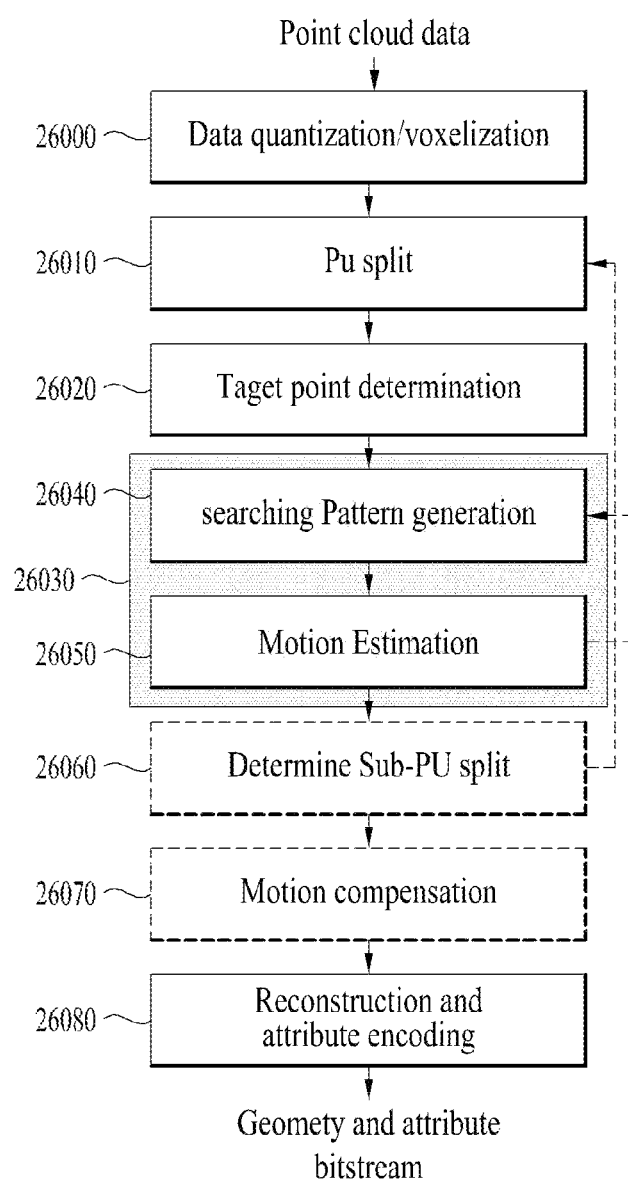
FIG. 26 illustrates a point cloud data transmission process according to embodiments.

FIG. 26 illustrates a point cloud data transmission process according to embodiments.

The motion compensation target selector 16000, the motion compensation target value calculator 16010, the searching pattern generator 16020, and/or the motion estimation executor 16030 of FIG. 16 included in the transmission device 10000 of FIG. 1, the point cloud video encoder 10002 of FIG. 1, the encoding of FIG. 2, the encoder of FIG. 4, the transmission device of FIG. 13, the device of FIG. 14, or the like may encode and transmit point cloud data based on the operations illustrated in FIG. 26.

26000: The point cloud transmission device according to the embodiments may acquire point cloud data and perform quantization and/or voxelization to perform an encoding procedure.

When the point cloud data is input to the encoder (transmission device), data quantization and/or voxelization is performed to facilitate compression processing. For details of the quantization and voxelization according to embodiments, reference may be made to the description of the element 40001 in FIG. 4.

26010: The point cloud transmission device according to the embodiments may split the point cloud data based on a prediction unit (PU), which is a unit for applying prediction coding to the point cloud data. When there are multiple frames containing the point cloud data, the point cloud data may be efficiently compressed by performing inter-prediction between the frames. Point cloud data in a current frame that is a target of current encoding may be split into PUs.

The points of the point cloud data are split into PUs in the current frame for inter-prediction.

26020: The point cloud transmission device according to the embodiments performs a search and comparison to find a target value for motion estimation.

For example, after PU splitting, points included in each PU component are searched for, and the region of a window including the PU region and larger than the PU is designated in a reference frame to search for points within the window region.

Among the distances between the points belonging to the PU and belonging to the window, points having a distance greater than a predetermined distance are excluded from the motion compensation target points, and a distance between the remaining points is selected as a target value for motion estimation and stored in a buffer.

For example, only distance values may be stored in the buffer. Since the motion vector is searched per block (PU), not per point, it is only necessary to find the distance of a target to be used for motion vector estimation among the points included in the PU and find only the best motion vector closest to the distance.

For details of calculation of the target value according to the embodiments, refer to the description of FIG. 16.

26030: The point cloud transmission device according to the embodiments may generate a searching pattern to perform motion estimation (see, for example, FIGS. 15 and 17 to 19).

26040: Before performing motion estimation, the point cloud transmission device according to the embodiments may generate a searching pattern based on variation condition values pre-declared in a sequence parameter set (SPS), tile parameter sets (TPS), geometry parameter set (GPS), attribute parameter set (APS), geometry and/or attribute slice header, which carries signaling information transmitted in a bitstream containing point cloud data, to configure a searching direction for motion estimation.

For details of the searching pattern generation process according to the embodiments, reference may be made to the descriptions of FIGS. 15 to 19.

26050: The point cloud transmission device according to the embodiments may perform motion estimation based on the searching pattern (e.g., FIGS. 15 to 19) according to the embodiments.

After the searching pattern is generated, MVs or candidate motion vectors are designated by applying the motion amount value (Amotion) defined in the SPS/APS/TPS/slice header, and an MV having the smallest difference between each pattern and the target value is found and designated as a motion vector for motion compensation.

Motion estimation may be performed in a narrower range by decreasing Amotion to improve the accuracy of motion estimation. In this case, in the second trial of motion estimation, the searching pattern may be updated in a narrower region or updated with a larger number of patterns as needed. In addition, information about a region where the vector is located with respect to the best motion vector, which is the result of the previous motion estimation, may be received and the searching pattern may be readjusted as necessary to perform motion estimation. In order to perform motion estimation optimized for the distribution of point cloud data, a searching pattern may be generated variously and many times.

26060: The point cloud transmission device according to the embodiments may determine whether to split the point cloud data into sub-PUs.

After the motion estimation is completed, the cost for the sub-PU-based splitting may be calculated. When the cost is an appropriate value, the point cloud data may be split into sub-PUs. Thereafter, the process may be repeated from the PU split operation, which is a step before the selection of a target point. When the splitting is skipped, motion compensation may be performed, and a bitstream may be sent through the reconstruction/attribute encoding operation. The motion compensation may be performed before the encoding, or may be performed in decoding by passing the motion vector to the decoder.

The motion estimation according to the embodiments is a process for finding an optimal motion (motion vector) of a given PU, and the motion compensation according to the embodiments is an operation of applying the optimal motion found in the motion estimation.

26070: The point cloud transmission device according to the embodiments may optionally perform additional motion compensation when sub-PU splitting is performed.

For example, after the motion estimation is completed, the cost of splitting into sub-PUs is calculated. When splitting into sub-PUs is performed, the process repeats from the PU splitting operation before the target point selection.

When the splitting is skipped, motion compensation may be performed, and a bitstream may be sent through the reconstruction/attribute encoding operation.

The motion compensation may be performed before the encoding, or may be performed in decoding by passing the motion vector to the point cloud reception device (decoder) according to the embodiments.

While the point cloud encoding device according to the embodiments may be described by distinguishing between geometry encoding and attribute encoding, attribute information belonging to the geometry may be used together with the geometry data (or geometry information) in PU splitting.

For example, in order to determine the best mode of PU split, the cost may be calculated based on the attribute value corresponding to a point present in the search range, not the distance between points. Similarly, in performing target point determination, a target point may be selected based on a difference in attribute between the points included in the PU and the window rather than a simple calculation of a distance of geometry, and then motion estimation and compensation may be performed thereon.

The best mode according to the embodiments may be referred to as the same term as the best range according to the embodiments.

26080: The point cloud transmission device according to the embodiments may reconstruct geometry data, encode attribute data of the point cloud data based on the reconstructed geometry data, and generate and transmit a bitstream containing the geometry data and the attribute data.

A point cloud data transmission device according to embodiments may include an encoder configured to encode point cloud data; and a transmitter configured to transmit the point cloud data.

The encoder configured to encode the point cloud data according to the embodiments may split the point cloud data based on a prediction unit (PU), generate a target point from a current frame and a reference frame for the point cloud data based on the PU, and generate a searching pattern.

The target point according to the embodiments may be determined based on a distance to points included in the PU.

Furthermore, a searching pattern may be generated based on at least one of an azimuth, an elevation, or a region for the point cloud data, and a best motion vector for the target point may be generated based on the searching pattern to estimate a motion. A bitstream containing parameter information related to the point cloud data may be transmitted.

A point cloud data reception device according to embodiments may receive a bitstream containing encoded point cloud data and a parameter set related to the point cloud data, and decode and reconstruct the point cloud data.

When a compensated point is received according to the motion estimation and motion compensation on the transmitting side, the compensated point may be reconstructed based on the received best motion vector.

When a point at which the motion estimation and motion compensation have not been applied on the transmitting side is received, the point cloud data may be split based on the PU, and a target point may be determined and motion compensation may be performed through the reference frame, as in the transmitting side process.

The point cloud data reception device according to the embodiments may include a receiver configured to receive point cloud data, and a decoder configured to decode the point cloud data.

The decoder configured to decode the point cloud data may split the point cloud data based on a prediction unit (PU), generate a target point from a current frame and a reference frame for the point cloud data based on the PU, and generate a searching pattern.

The target point according to the embodiments may be determined based on a distance to points included in the PU.

A searching pattern may be generated based on at least one of an azimuth, an elevation, or a region for the point cloud data, and a best motion vector for the target point may be generated based on the searching pattern to estimate a motion. The receiver configured to receive the point cloud data may receive a bitstream containing parameter information related to the point cloud data.

Figure 27:
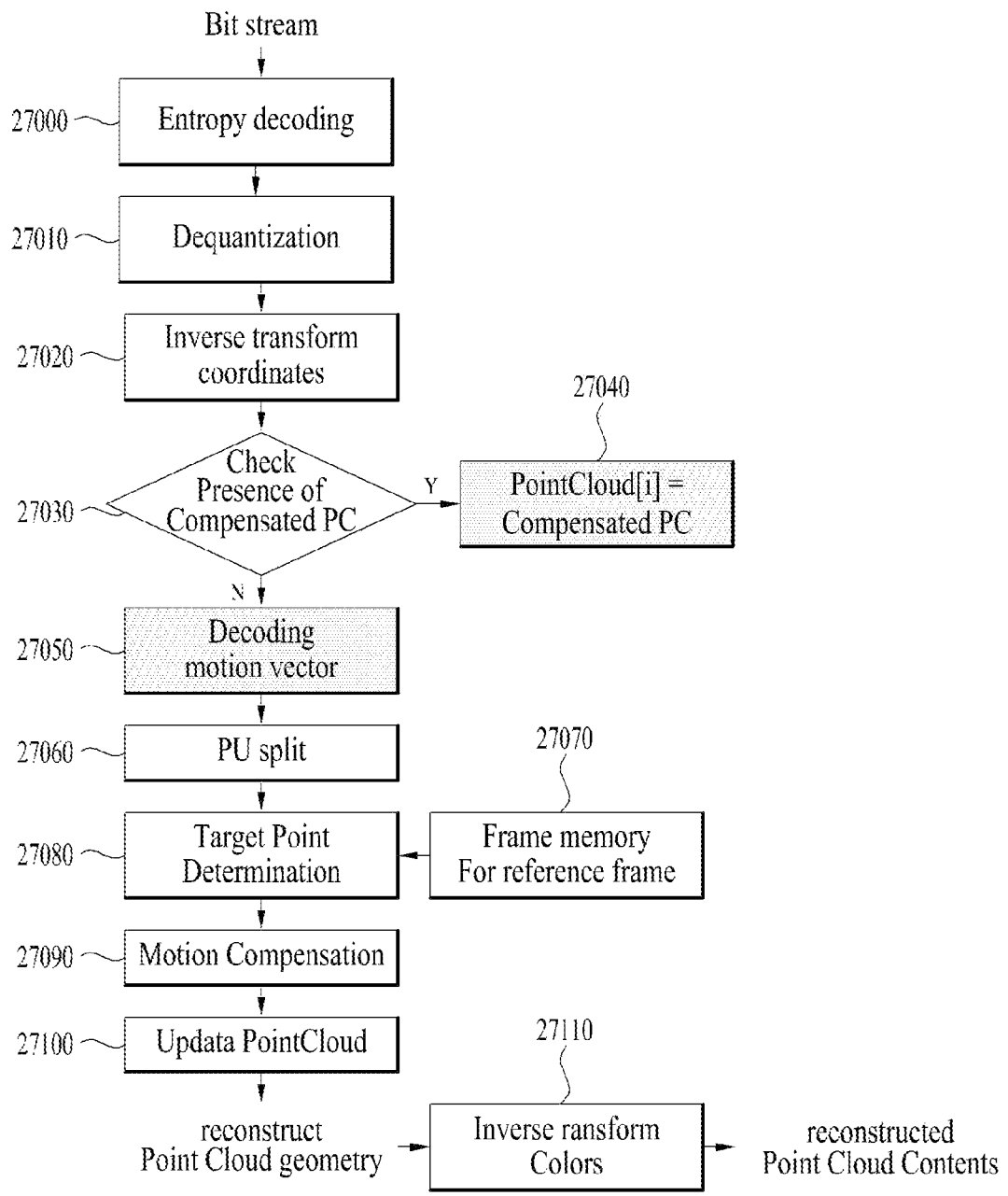
FIG. 27 illustrates a point cloud data reception process according to embodiments.

FIG. 27 illustrates a point cloud data reception process according to embodiments.

The motion compensation target selector 16000, the motion compensation target value calculator 16010, the searching pattern generator 16020, and/or the motion estimation executor 16030 of FIG. 16 included in the reception device 10004 of FIG. 1, the point cloud video decoder 10006 of FIG. 1, the decoding of FIG. 2, the decoder of FIGS. 10 and 11, the reception device of FIG. 14, the device of FIG. 14, or the like may reconstruct point cloud data based on the operations illustrated in FIG. 27.

27000: The point cloud reception device according to the embodiments may receive a bitstream containing point cloud data from the point cloud transmission device according to the embodiments. The receiver reconstructs an original point cloud based on a residual, which is a prediction error for each point, by performing entropy decoding, dequantization, and inverse transformation on the received bitstream. The reception operation may follow the reverse process of the transmission operation.

27010: The point cloud reception device according to the embodiments may perform inverse quantization on the point cloud data.

27020: The point cloud reception device according to the embodiments may inversely transform the coordinate information related to the point cloud data.

27030: The point cloud reception device according to the embodiments may determine, based on a flag, that the point cloud data is a motion-compensated point from the signaling information included in the bitstream containing the point cloud data shown in FIGS. 20 to 25 and the like.

27040: When the i-th point cloud corresponds to the compensated point, the point cloud reception device according to the embodiments decodes the point.

For the compensated point, the decoded compensated PointCloud is input as the PointCloud information about the corresponding position, i.

27050: When there is no compensated point for the point[i], the point cloud reception device according to the embodiments decodes the motion vector received from the transmission device (or encoder).

27060: The point cloud reception device according to the embodiments splits the point cloud data in an original PU form.

27070: The point cloud reception device according to the embodiments checks frame related information from a frame memory for the reference frame.

27080: The point cloud reception device according to the embodiments selects a target point to be subjected to motion compensation from frames including point cloud data.

27090: The point cloud reception device according to the embodiments performs the motion compensation.

27100: The point cloud reception device according to the embodiments replaces (updates) the value with a point cloud at the corresponding position.

The reconstructed point cloud geometry may be stored in the frame memory as information predicted for a point in the PU range of the current frame having motion vector information delivered for each PU, and may be used as data prediction information within the PU range of the next frame.

27110: When the reconstruction of the geometry is completed, the point cloud reception device according to the embodiments inversely transforms color information to include attribute information in the corresponding position and transmits the reconstructed point cloud contents to the renderer.

A search range according to embodiments may be larger than a PU according to embodiments. That is, since the PU divides the current frame into octree nodes in a non-overlapping manner, the search range may be set in an overlapping form in the reference frame.

The method/device according to the embodiments finds a point to be included in a corresponding PU among points included in a search range by applying MV. The same point may be included in the search range in the next PU (when the regions of the search ranges overlap each other). In that case, the point is a compensated point because it is already included in the previous PU.

Therefore, for the compensated points, Point Cloud[i]=Compensated PC may be set such that a case where duplicate points are produced may not be considered.

When the transmission method/device according to the embodiments performs inter prediction, the transmitter encodes only a motion vector.

The reception method/device according to the embodiments, that is, the decoder, may receive and compensate for only the motion vector found by the encoder without performing motion vector estimation.

In the decoding process, since intra prediction is applied to the first frame in the order, there is no motion vector information, and the motion vector is decoded and compensated when the next frame is decoded.

The point cloud (or point cloud data) may include geometry information (geometry data), and a compensated PC may be input to the i-th geometry information.

Since the absence of a compensated point means that the motion vector has never been applied in the encoding process of the transmitting side, the receiver may decode the motion vector and perform inter prediction by applying the motion vector to the point included in the search range (This receiving-side process may be the same process as motion compensation in transmission).

In this case, the motion vector means may mean the best vector closest to a target value found by a combination of searching patterns.

The transmission method/device according to the embodiments searches for distances between all points included in point P1 and point P2, stores distances less than a specific reference value in a target buffer, and compares distances obtained by applying the value of search pattern x scale to P2 with the distances included in the target buffer. Then, it generates a vector of search pattern x scale having the smallest distance difference as a motion vector. This process is iterated by changing the scale value or the searching pattern to find the best motion vector (that is, a motion vector to be encoded is generated).

In order to reconstruct the current frame, the reception method/device according to the embodiments may reconstruct p1 by applying the decoded motion vector to p2 because P2 is a coded frame thus has information.

Figure 28:
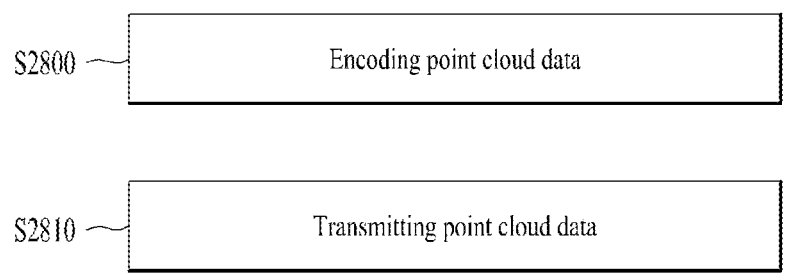
FIG. 28 illustrates a point cloud data transmission method according to embodiments.

FIG. 28 illustrates a point cloud data transmission method according to embodiments.

S2800: The method of transmitting point cloud data according to the embodiments may include encoding point cloud data. The encoding operation according to the embodiments may include the operations of the point cloud data acquisition 10001 of FIG. 1, the point cloud video encoder 10002 of FIG. 2, the acquisition 20000, the encoding 20001 of FIG. 2, the encoder of FIG. 4, and the point cloud data transmission device of FIG. 13, data processing of each device of FIG. 14, the searching pattern-based motion estimation 16000 to 16030 according to FIG. 16, inter-prediction according to a searching pattern in FIGS. 15 to 19, the generation of signaling information (or parameters or metadata) in FIGS. 20 to 25, and the searching pattern generation and/or motion estimation according to FIG. 26.

S2810: The point cloud data transmission method according to the embodiments may further include transmitting the point cloud data. The transmission operation according to the embodiments may include the operations of the transmitter 10003 of FIG. 1, the transmission 20002 of FIG. 2, the transmission of a bitstream including a geometry bitstream and an attribute bitstream of FIG. 4, the transmission of encoded point cloud data of FIG. 12, transmission of data between the devices of FIG. 14, and transmission of a bitstream containing the encoded point cloud data according to FIGS. 15 to 19 and 26 and the signaling information of FIGS. 20 to 25.

Figure 29:
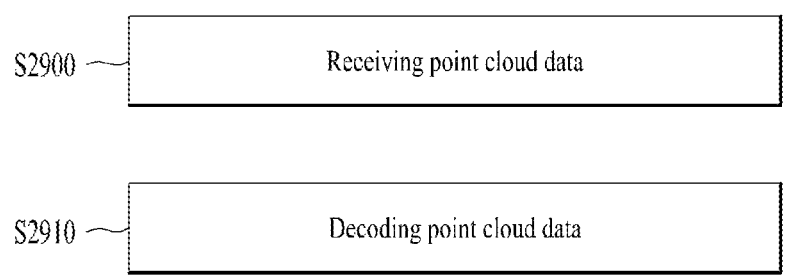
FIG. 29 illustrates a point cloud data reception method according to embodiments.

FIG. 29 illustrates a point cloud data reception method according to embodiments.

S2900: The method of receiving point cloud data according to the embodiments may include receiving point cloud data. The reception operation according to the embodiments may include the operations of the receiver 10005 of FIG. 1, the reception according to the transmission of FIG. 2, the reception operation of the reception device of FIG. 13, data transmission/reception between the devices of FIG. 15, reception of encoded point cloud data according to FIGS. 15 to 19, reception of a bitstream containing the signaling information (parameter information) of FIGS. 20 to 25, and reception of a bitstream according to FIG. 27.

S2910: The point cloud data reception method according to the embodiments may further include decoding the point cloud data. The decoding operation according to the embodiments may include the operations of the point cloud video decoder 10006 of FIG. 1, the decoding 20003 of FIG. 2, the decoder of FIGS. 10 and 11, the reception device of FIG. 13, data processing of the devices of FIG. 14, decoding based on the searching pattern according to FIGS. 15 to 19, decoding based on the parameter information of FIGS. 20 to 25, and the decoding of the point cloud data bitstream of FIG. 27.

The reception operation according to the embodiments may follow a reverse process of the transmission operation according to the corresponding embodiments.

The method/device for transmitting and receiving point cloud data according to the embodiments may efficiently process compression of point cloud content having one or more frames. By applying a searching pattern having unit vectors evenly distributed in all directions for motion estimation, an issue of failing to efficiently perform motion estimation because the form and characteristics of distribution of the point cloud are not reflected may be addressed. Furthermore, the searching pattern may be distributed differently depending on the location. By predicting motion by generating a searching pattern reflecting the characteristics of the content, the accuracy may be improved and the cost of additional splits may be reduced. Further, by distributing the searching pattern differently according to each position, the encoding/decoding time taken for motion estimation for an unnecessary region may be reduced.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR DISCLOSURE

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

What is claimed is:

1. A method of encoding point cloud data, the method comprising:
   encoding geometry data of point cloud data,
   wherein the geometry data is encoded based on inter prediction,
   wherein motion compensation is applied to a reference frame for the inter prediction,
   wherein points for the reference frame are determined based on a threshold;
   encoding attribute data of the point cloud data; and
   transmitting a bitstream including the point cloud data,
   wherein the bitstream includes parameter information to determine the points for the inter prediction.

2. The method of claim 1, wherein the encoding of the point cloud data comprises:
   splitting the point cloud data based on a prediction unit (PU);
   generating a target point from a current frame and a reference frame for the point cloud data based on the PU; and
   generating a searching pattern.

3. The method of claim 2, wherein the target point is determined based on distances to points included in the PU.

4. The method of claim 2, further comprising:
   generating the searching pattern based on at least one of an azimuth, an elevation, or a region for the point cloud data; and generating a best motion vector for the target point based on the searching pattern and performing motion estimation.

5. A device for encoding point cloud data, the device comprising:
an encoder configured to encode geometry data of point cloud data,
wherein the geometry data is encoded based on inter prediction,
wherein motion compensation is applied to a reference frame for the inter prediction,
wherein points for the reference frame are determined based on a threshold;
encode attribute data of the point cloud data; and
a transmitter configured to transmit a bitstream including the point cloud data,
wherein the bitstream includes parameter information to determine the points for the inter prediction.

6. The device of claim 5, wherein the encoder configured to encode the point cloud data is configured to:
split the point cloud data based on a prediction unit (PU);
generate a target point from a current frame and a reference frame for the point cloud data based on the PU; and
generate a searching pattern.

7. The device of claim 6, wherein the target point is determined based on distances to points included in the PU.

8. The device of claim 6, wherein the device is configured to:
generate the searching pattern based on at least one of an azimuth, an elevation, or a region for the point cloud data; and
generate a best motion vector for the target point based on the searching pattern and perform motion estimation.

9. A method of decoding point cloud data, the method comprising:
receiving a bitstream including point cloud data;
decoding geometry data of the point cloud data,
wherein the geometry data is decoded based on inter prediction,
wherein motion compensation is applied to a reference frame for the inter prediction,
wherein points for the reference frame are determined based on a threshold;
decoding attribute data of the point cloud data,
wherein the bitstream includes parameter information to determine the points for the inter prediction.

10. The method of claim 9, wherein the decoding of the point cloud data comprises:
splitting the point cloud data based on a prediction unit (PU);
generating a target point from a current frame and a reference frame for the point cloud data based on the PU; and
generating a searching pattern.

11. The method of claim 10, wherein the target point is determined based on distances to points included in the PU.

12. The method of claim 10, further comprising:
generating the searching pattern based on at least one of an azimuth, an elevation, or a region for the point cloud data; and
generating a best motion vector for the target point based on the searching pattern and performing motion estimation.

13. A device for decoding point cloud data, the device comprising:
a receiver configured to receive a bitstream including point cloud data; and
a decoder configured to
decode geometry data of the point cloud data,
wherein the geometry data is decoded based on inter prediction,
wherein motion compensation is applied to a reference frame for the inter prediction,
wherein points for the reference frame are determined based on a threshold;
decode attribute data of the point cloud data,
wherein the bitstream includes parameter information to determine the points for the inter prediction.

14. The device of claim 13, wherein the decoder configured to decode the point cloud data is configured to:
split the point cloud data based on a prediction unit (PU);
generate a target point from a current frame and a reference frame for the point cloud data based on the PU; and
generate a searching pattern.

15. The device of claim 14, wherein the target point is determined based on distances to points included in the PU.

16. The device of claim 14, wherein the device is configured to:
generate the searching pattern based on at least one of an azimuth, an elevation, or a region for the point cloud data; and
generate a best motion vector for the target point based on the searching pattern and perform motion estimation.

* * * * *